(12) United States Patent
Smigelski

(10) Patent No.: US 10,169,293 B2
(45) Date of Patent: *Jan. 1, 2019

(54) FRACTIONAL SCALING DIGITAL FILTERS AND THE GENERATION OF STANDARDIZED NOISE AND SYNTHETIC DATA SERIES

(71) Applicant: Wright State University, Dayton, OH (US)

(72) Inventor: Jeffrey R. Smigelski, Dayton, OH (US)

(73) Assignee: WRIGHT STATE UNIVERSITY, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,516

(22) Filed: Aug. 21, 2017

(65) Prior Publication Data

US 2018/0165249 A1   Jun. 14, 2018

Related U.S. Application Data

(63) Continuation of application No. 14/469,171, filed on Aug. 26, 2014, now Pat. No. 9,740,662.

(Continued)

(51) Int. Cl.
 *G06F 17/00*  (2006.01)
 *G06F 17/14*  (2006.01)
(52) U.S. Cl.
 CPC .................. *G06F 17/141* (2013.01)
(58) Field of Classification Search
 None
 See application file for complete search history.

(56) References Cited

U.S. PATENT DOCUMENTS 7,599,752 B2   10/2009 Chen
2003/0152021 A1   8/2003 Wang et al.
(Continued)

FOREIGN PATENT DOCUMENTS

| CN | 103309238 A | 9/2013 |
|---|---|---|
| CN | 103427789 A | 12/2013 |
| CN | 103558755 A | 2/2014 |

OTHER PUBLICATIONS

Marques, Gabriela; International Search Report and the Written Opinion of the International Searching Authority for PCT Application No. PCT/US2015/046184; dated Oct. 30, 2015; European Patent Office; Rijswijk, Netherlands.

(Continued)

*Primary Examiner* — Michael D. Yaary
(74) *Attorney, Agent, or Firm* — Thomas E. Lees, LLC

(57) ABSTRACT

A method for processing a digital signal comprises identifying a desired frequency and/or phase response that is represented in a frequency domain representation. A fractional order control system that models the desired frequency and/or phase response is constructed by assembling a first filter component from a filter component library and a second filter component from the filter component library. At least one filter component of the filter component library is defined by a Laplace function that includes a non-integer control order having a variable fractional scaling exponent and a value for the non-integer, variable fractional scaling exponent of the second filter component is based on a value of the non-integer, variable fractional scaling exponent of the first filter component. An input in the digital frequency domain is received and processed based upon the fractional order control system to generate a digital output. The output is then conveyed to a user.

15 Claims, 18 Drawing Sheets

Related U.S. Application Data

(60) Provisional application No. 61/870,052, filed on Aug. 26, 2013, provisional application No. 61/870,064, filed on Aug. 26, 2013, provisional application No. 62/039,684, filed on Aug. 20, 2014.

(56) References Cited

U.S. PATENT DOCUMENTS

| 2006/0265085 A1* | 11/2006 | Chen | G05B 13/024 |
| | | | 700/41 |
| 2016/0028239 A1* | 1/2016 | Zhang | H02J 5/005 |
| | | | 307/104 |

OTHER PUBLICATIONS

Nickitas-Etienne, Athina; International Preliminary Report on Patentability for PCT Application No. PCT/US2015/046184; dated Mar. 2, 2017; The International Bureau of WIPO; Geneva, Switzerland.

* cited by examiner

| Selected β Value | Scaling Exponent of Synthetic Time Series (N = 4096) Mean of 1000 Trials | Standard Deviation (1000 Trials) |
| --- | --- | --- |
| β = −1 | −0.9886 | 0.0297 |
| β = 0.0 | 0.0005 | 0.0286 |
| β = 0.5 | 0.4953 | 0.0283 |
| β = 1.0 | 0.9875 | 0.0584 |
| β = 1.5 | 1.4835 | 0.0274 |
| β = 2.0 | 1.9790 | 0.0294 |
| β = 2.5 | 2.4729 | 0.0286 |
| β = 3.0 | 2.9676 | 0.0277 |
| β = 3.5 | 3.4626 | 0.0287 |
| β = 4.0 | 3.9573 | 0.0282 |
| β = 4.5 | 4.4519 | 0.0286 |

FIG. 3

| 6 Basic Building Block Transfer Function Equations as Fractional Scaling Digital Filters ||| 
| Laplace Equation | Transfer Function Equations (Written in terms of $\beta$ in the positive frequencies of the Complex DFT) | Bode Magnitude and Phase Plots at $\beta = 2$ and $k = 0.01$ |
|---|---|---|
| Low Pass (Lag) Filter (formerly 1st Order) *Original Form* $\left(\dfrac{k}{s+k}\right)$ *Modified Form* $\left(\dfrac{k}{s+k}\right)_{\frac{\beta}{2}}$ 4.) | Magnitude $M_{(\pm\omega)} = \sqrt{\dfrac{k^{\beta}}{\omega^{\beta}+k^{\beta}}}$ Note: A -3 dB attenuation of Magnitude occurs at a gain of $k = 0.01$ Phase $\theta_{(+\omega)} = -\tan^{-1}\left(\dfrac{\omega^{\frac{\beta}{2}}}{k^{\frac{\beta}{2}}}\right)$ Note: The phase passes through -45° at a gain of $k = 0.01$ | (Bode magnitude and phase plots) |
| Low Pass (Lag) Filter (formerly 2nd Order) *Original Form* $\left(\dfrac{k^2}{s^2+2ks+k^2}\right)$ *Modified Form* $\left(\dfrac{k^2}{s^2+2ks+k^2}\right)_{\frac{\beta}{4}}$ 5.) | Magnitude $M_{(\pm\omega)} = \sqrt{\dfrac{k^{\beta}}{\omega^{\beta}+2k^{\frac{\beta}{2}}\omega^{\frac{\beta}{2}}+k^{\beta}}}$ Note: A -6 dB attenuation of Magnitude occurs at a gain of $k = 0.01$ Phase $\theta_{(+\omega)} = -\tan^{-1}\left(\dfrac{2k^{\frac{\beta}{4}}\omega^{\frac{\beta}{4}}}{k^{\frac{\beta}{2}}-\omega^{\frac{\beta}{2}}}\right)$ Note: The phase passes through -90° at a gain of $k = 0.01$ | (Bode magnitude and phase plots) |
| Low Pass Resonance Filter with damping coefficient (d) (formerly 2nd Order) *Original Form* $\left(\dfrac{k^2}{s^2+2dks+k^2}\right)$ *Modified Form* $\left(\dfrac{k^2}{s^2+2dks+k^2}\right)_{\frac{\beta}{4}}$ 6.) | Magnitude $M_{(\pm\omega)} = \sqrt{\dfrac{k^{\beta}}{\omega^{\beta}-2k^{\frac{\beta}{2}}\omega^{\frac{\beta}{2}}+4d^2k^{\frac{\beta}{2}}\omega^{\frac{\beta}{2}}+k^{\beta}}}$ Note: A Resonance Peak in Magnitude occurs at a gain of $k = 0.01$ and the height of this peak is determined by the damping coefficient (d). Here, $d = 2.5 \times 10^{-5}$. Phase $\theta_{(+\omega)} = -\tan^{-1}\left(\dfrac{2d^{\frac{\beta}{4}}k^{\frac{\beta}{4}}\omega^{\frac{\beta}{4}}}{k^{\frac{\beta}{2}}-\omega^{\frac{\beta}{2}}}\right)$ Note: The phase passes through -90° at a gain of $k = 0.01$ | (Bode magnitude and phase plots) |

FIG. 8

| Basic Building Block | Positive Scaling Exponent (+β) | | Negative Scaling Exponent (−β) | |
|---|---|---|---|---|
| Transfer Function | Original Form | Action | Alternative Form | Action |
| $\frac{1}{s^\beta}$ | Integrator | Performs Integration or Fractional Integration. | Differentiator | Performs Differentiation or Fractional Differentiation. |
| $\left(\frac{s+k}{k}\right)^\beta$ | 1st Order High Frequency Amplifier | Amplifies high frequencies and passes low frequencies. | 1st Order Low Frequency Amplifier | Amplifies low frequencies and passes high frequencies. |
| $\left(\frac{s^2+2ks+k^2}{k^2}\right)^\beta$ | 2nd Order High Frequency Amplifier | Amplifies high frequencies and passes low frequencies. | 2nd Order Low Frequency Amplifier | Amplifies low frequencies and passes high frequencies. |
| $\left(\frac{k}{s+k}\right)^\beta$ | 1st Order Low Pass (Lag) Filter | Passes low frequencies and attenuates high frequencies. | 1st Order High Pass Filter | Passes high frequencies and attenuates low frequencies. |
| $\left(\frac{k^2}{s^2+2ks+k^2}\right)^\beta$ | 2nd Order Low Pass (Lag) Filter | Passes low frequencies and attenuates high frequencies. | 2nd Order High Pass Filter | Passes high frequencies and attenuates low frequencies. |
| $\left(\frac{k^2}{s^2+2dks+k^2}\right)^\beta$ | 2nd Order Low Pass Resonance Filter with Damping Coefficient | Passes low frequencies and attenuates high frequencies. Damping coefficient (d) controls resonance peak behavior. | --- | --- |

FIG. 9

| index | Conversion formula $\rightarrow$ | $f$ | Conversion $(2\pi f)$ $\rightarrow$ | $\omega$ | |
|---|---|---|---|---|---|
| $m=0$ | $\rightarrow$ | 0 | $\rightarrow$ | 0 | |
| $m=1$ | $\left[\frac{m}{N}\right]$ | $\frac{1}{N}$ | $\ast 2\pi$ | $2\pi\left(\frac{1}{N}\right)$ | *positive frequencies* |
| ... | | ... | | ... | |
| $m=\frac{N}{2}-1$ | | $\frac{m}{N}$ | | $2\pi\left(\frac{m}{N}\right)$ | |
| $m=\frac{N}{2}$ | $\rightarrow$ | $\pm 0.5$ | $\rightarrow$ | $\pm\pi$ | |
| $m=\frac{N}{2}+1$ | $\left[\frac{m-N}{N}\right]$ | $\frac{m-N}{N}$ | $\ast 2\pi$ | $2\pi\left(\frac{m-N}{N}\right)$ | *negative frequencies* |
| ... | | ... | | ... | |
| $m=N-1$ | $\rightarrow$ | $-\frac{1}{N}$ | $\rightarrow$ | $2\pi\left(-\frac{1}{N}\right)$ | |

FIG. 14

FRACTIONAL SCALING DIGITAL FILTERS AND THE GENERATION OF STANDARDIZED NOISE AND SYNTHETIC DATA SERIES

CROSS-REFERENCE TO RELATED APPLICATIONS

This application is a continuation of U.S. patent application Ser. No. 14/469,171, entitled 'FRACTIONAL SCALING DIGITAL FILTERS AND THE GENERATION OF STANDARDIZED NOISE AND SYNTHETIC DATA SERIES', filed Aug. 26, 2014, now allowed, which claims the benefit of U.S. Provisional Patent application Ser. No. 61/870,052 entitled 'CONTROL THEORY AND CONVOLUTION' and filed Aug. 26, 2013, claims the benefit of U.S. Provisional Patent application Ser. No. 61/870,064 entitled 'TIME DELAY AND THE SCALING EXPONENT' and filed Aug. 26, 2013, and claims the benefit of U.S. Provisional Patent application Ser. No. 62/039,684 entitled "Fractional Scaling Digital Filters and Fractional Order Control Systems" and filed Aug. 20, 2014 The entireties of the above-noted applications are incorporated by reference herein.

BACKGROUND

Conventional quantification of stochastic signals through time has generally been performed through either direct analysis of a time series in the time domain (e.g., Rescaled-Range Analysis, Detrended Fluctuation Analysis) or through examination of the power spectrum of the time series upon conversion to the frequency domain (e.g., discrete Fourier transform, fast Fourier transform). Many conventional time series analysis methods tend to focus on patterns, trends, periodicities, correlations, or structure within a signal, the way in which values rise and fall over time. However, by focusing only on the behavior of values of the time series and not addressing the underlying mechanisms of how the time series was generated, these methods provide limited short-term insight into the current and future predictability of the time series.

A digital filter is a computational tool that accepts a sequence of numbers as input and returns a new altered sequence of numbers as output. The sequence of numbers, as a digital signal, represents information about a recorded, measured quantity that varies with time (or position) such as, but not limited to, audio, communications, radio, television, voltages, SONAR, RADAR, medical data (e.g., EEG data), economic data (e.g., stock market prices), environmental data (e.g., water level fluctuations), and positional data (e.g., control systems). A digital filter may be used to integrate, differentiate, smooth, predict, restore, or separate a signal. Digital filters may also be used to eliminate noise from a signal or to model the internal dynamics of the system that generated the signal.

Conventional digital filters employ integer order calculus. In the field of digital signal processing (DSP), the design of a digital filter is a delicate balance between performance, precision, accuracy, and efficiency. While digital filters generally exhibit a high level of performance, conventional digital filter design technology is often limited in ability to accurately perform exact frequency modifications on a signal. In many instances, the filtered signal contains mathematical artifacts of the filtering process (e.g., ripples, wide transition band with slow roll-off, etc.), as approximations of the ideal signal which may manifest as a loss of information in the signal.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

A method for processing a digital signal comprises identifying a desired frequency and/or phase response that is represented in a frequency domain representation. A fractional order control system that models the desired frequency and/or phase response is constructed by assembling a first filter component from a filter component library and a second filter component from the filter component library. At least one filter component of the filter component library is defined by a Laplace function that includes a non-integer control order having a variable fractional scaling exponent and a value for the non-integer, variable fractional scaling exponent of the second filter component is based on a value of the non-integer, variable fractional scaling exponent of the first filter component. An input in the digital frequency domain is received and processed based upon the fractional order control system to generate a digital output. The output is then conveyed to a user.

In another aspect, a method for processing a digital signal comprises identifying a desired frequency and/or phase response that is represented in a frequency domain representation. A fractional order control system that models the desired frequency and/or phase response is constructed by assembling a filter component from a filter component library. Further, at least one filter component of the filter component library is defined by a Laplace function that includes a non-integer control order having a variable fractional scaling exponent. An input in the digital frequency domain is received and processed based upon the fractional order control system to generate a digital output. Moreover, the variable fractional scaling exponent self-adjusts based on the received input. The output is then conveyed to a user.

The development of fractional scaling digital filters may be encoded into a field-programmable gate array (FPGA) device or on digital signal processing (DSP) chipsets. In various embodiments, a DSP chip in accordance with aspects of the subject innovation can include an integrated circuit comprising a core, memory and other internal components or hardware that can perform the fractional scaling and/or phase shifting of the $$\frac{1}{s}$$

noise equations. Each of the eleven fundamental forms of the basic building block transfer functions described herein, as fractional scaling digital filters, containing the fractional scaling characteristics of the transfer function can be encoded on FPGA devices or DSP chipsets to be built into electronic devices. In the fields of digital and audio signal processing and electrical engineering, the building block transfer functions incorporating the fractional scaling exponent allow for the development of highly accurate filtering equations for specific scaling and/or phase shifting behaviors to filter or identify similar systems or to fine tune traditional filters to act as fractional integrator or differentiator filters, fractional low or high pass filters, fractional low or high pass amplifiers, fractional band pass or notch filters, fractional resonance filters, or any combination of fractional filters. Additionally, each of the more sophisticated fractional scaling digital filters created from the building block transfer functions such as the Low Pass Fractional Scaling Digital Filter, High Pass Fractional Scaling Digital Filter, Band Pass Fractional Scaling Digital Filter, Notch Fractional Scaling Digital Filter, Resonance Fractional Scaling Digital Filter, Harmonic Resonance Fractional Scaling Digital Filter, described herein, or any other complex fractional scaling digital filter or Frequency Response Model can also be encoded on FPGA devices or DSP chipsets to be built into electronic devices. Electrical circuits which use analog equations or Laplace transfer functions with only integer exponents in the Laplace may be replaced with fractional scaling digital filters to create a fully digital circuit. For example, an electronic DSP filter that encodes a cascade of analog equations needed to achieve an approximate scaling behavior can be replaced with a single fractional scaling digital filter incorporating the fractional scaling exponent to achieve a DSP filter with exact scaling behavior. Encoding the building block transfer functions of the subject innovation on FPGA devices or DSP chipsets to function as digital circuits, fractional scaling digital filters, fractional scaling systems, and fractional order control systems can reduce computation time, increase efficiency allowing for faster circuits or response through the system, and improve the accuracy of circuits and DSP chipsets containing these digital fractional scaling filters, eliminating approximation errors. Given the prevalence of FPGA devices and DSP chipsets in virtually all modern electronics, the subject innovation can be used in FPGA devices and DSP chipsets for audio, video, aerospace, radio, cellular, and a variety of other electronic applications.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates a table showing the results of evaluation tests run on an example embodiment in accordance with FIG. 2.

FIG. 8 illustrates another three basic building block transfer functions.

FIG. 9 illustrates eleven fundamental forms of the basic building block transfer functions.

FIG. 14 illustrates the relation between index values, frequencies, and angular frequencies.

DETAILED DESCRIPTION

Figure 1:
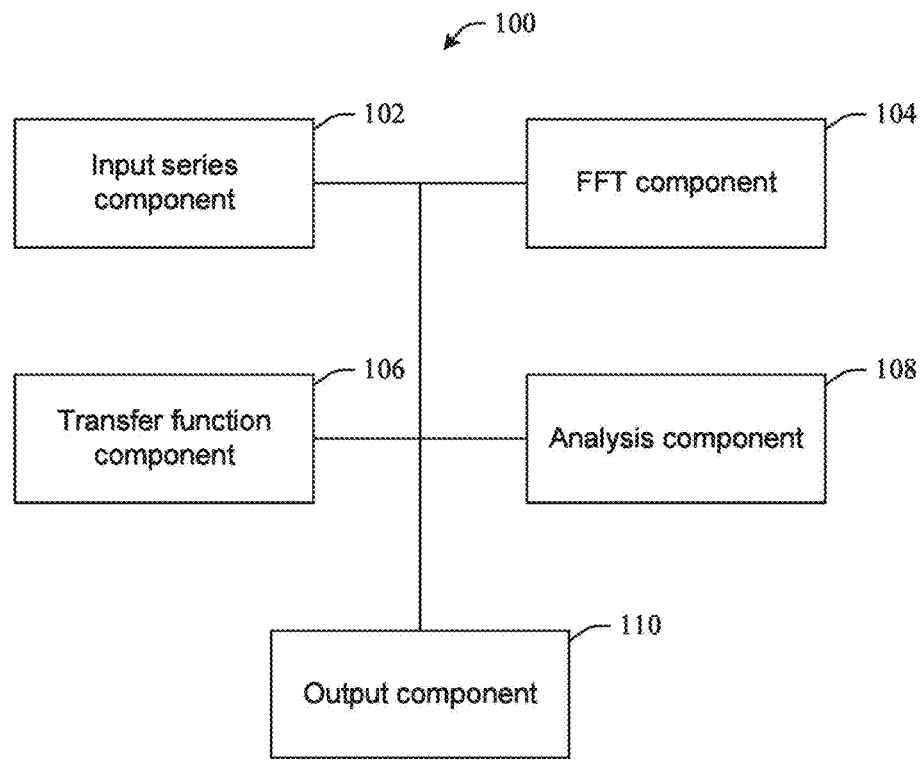
FIG. 1 illustrates a system capable of generating an output series with selected scaling behavior in accordance with aspects of the system.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, DSP chipset, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof (e.g., FPGA device, DSP chipset, etc.) to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

In various aspects, the subject innovation can comprise a fractional scaling digital filter, which can employ fractional order calculus. To address the limitations of conventional digital filter designs, fractional scaling digital filters as discussed herein can employ designs that are refinements of conventional digital filter designs, and which can resemble the behavior of an ideal filter. Fundamentally, fractional scaling digital filters such as those discussed herein can employ fractional calculus, and thus fractional filtering (e.g., fractional scaling, fractional phase shifting, fractional integration, fractional differentiation, etc.), to be performed on a signal, can represent more exact filtering solutions, not approximations as with conventional filters, and demonstrably are extremely accurate, highly efficient, and perform better than conventional filters.

Embodiments of the subject innovation, such as the development of fractional scaling digital filters offers the potential to revolutionize the way in which digital signals and systems are seen, modeled, filtered, and controlled, and represents a significant technological advancement over conventional digital filter designs. The application of fractional scaling digital filters to digital signals, or to define fractional control order systems, has great potential to generate robust solutions for the future by refining current analytical tools and methods within a multitude of disciplines from control theory, cybernetics, information theory, medicine, neuroscience, neuroengineering, cognitive science, and the human behavioral sciences to aerospace, control systems, robotics, mechanical engineering, mechatronics, sensors, electrical engineering, telecommunications, audio, video, and digital signal processing, and applications such as RADAR and SONAR.

The subject innovation, in aspects thereof, can comprise systems and methods that employ a Laplace standardized noise generator, which can use standardized transfer function methods and techniques described herein to generate a synthetic time series of any length with exact scaling behavior of any scaling exponent across all frequencies. Standardized transfer function methods described herein can be used to generate both single scaling and multiple scaling time series. Synthetic time series produced via methods and techniques described herein can be employed in a variety of settings, for example, as standards for testing methods, as test signals in digital processes, in noise generators, etc. Systems and methods of the subject innovation can produce mathematically correct noise with no errors and no loss of data, and can generate the noise of specific environments or systems based on the transfer functions of those environments or systems.

In other aspects, the subject innovation can comprise systems and methods that employ techniques associated with a scaling-noise frequency response model and synthetic generator that can identify mathematical properties of the complex internal dynamics of a system by generating a transfer function from the scaling behavior of any stochastic time series. The transfer function is the Frequency Response Model (FRM) of the system, which is then used to generate a synthetic time series with the same scaling behavior as the original stochastic time series across all frequencies. The incorporation of the fractional scaling exponent $\beta$ (which can also take integer values, e.g., 4/2=2, etc.) within the transfer function of the system yields the FRM which accurately describes the underlying dynamics of the system that generated the stochastic time series, encapsulates time series scaling behavior through exact quantitative complex frequency domain models, allows calculation of the output response to any given input, and enables the synthetic reconstruction of new instances of any stochastic times series given an alternative input.

Techniques disclosed herein can be applied in a multitude of disciplines, such as environmental science, geophysics, medicine, neuroscience, economics, control theory, cybernetics, information theory, electrical engineering, robotics, digital and audio signal processing, etc. Applications can include simulations, modeling and risk assessment, computer modeling and simulation (e.g., in movies, gaming, etc.), military applications such as adaptive camouflage, audio signal processing and medicine, human behavior and neuroscience, electrical engineering (digital and audio signal processing chipsets), SONAR and RADAR, astronomy, and many more. Techniques disclosed herein extend the mathematics and techniques behind conventional stochastic $$\frac{1}{f}$$

noise to develop techniques involving the fractional calculus of $$\frac{1}{s}$$

noise, which incorporates the scaling exponent into Laplace transforms, allowing for exact solutions to transfer functions, rather than approximations.

In techniques of the subject innovation, building on conventional control theory research, the Laplace term (s) and the scaling exponent can be incorporated into six basic building block transfer functions (discussed infra), solved for magnitude and phase, which, alone or in combination, describe nearly all aspects of the behavior of stochastic time series in the (complex) frequency domain to create a FRM for any time series that exhibits single or multiscaling behavior.

Referring initially to the drawings, FIG. 1 illustrates a system 100 in accordance with aspects of the system. System 100 can comprise an input series component 102 that receives or generates an input (e.g., white noise, etc.) series e.g., as simulated input to a system being modeled or for generation of output signals (e.g., as standards, etc.) in accordance with aspects of the subject innovation. The white noise input series can be generated from a random number generator or from techniques disclosed herein that can provide more pure noise signals. Fast Fourier transform (FFT) component 104 can convert the time domain input signal to the complex frequency domain. Transfer function component 106 can multiply the complex frequency domain representation of the time domain input signal by a selected transfer function to generate a complex frequency domain representation of the output series, which can be selected based on a desired effect (e.g., filtering, integration, differentiation, etc., modeling a natural system, etc., or for other purposes described herein). Optionally, the transfer function of transfer function component 106 can be determined based on analysis of the input series by analysis component 108 to determine the scaling behavior of the input series and adjust the transfer function to achieve a target scaling behavior of the output series as described in greater detail below. In other aspects, as necessary, the analysis component 108 can perform preprocessing on the input series, such as when there are gaps in the input series or endpoint mismatch. The result of the multiplication performed by transfer function component 106 can be passed back to FFT component 104, which can perform an IFFT to convert the complex frequency domain representation of the output series to the time domain, which can then be output by output component 110.

Figure 2:
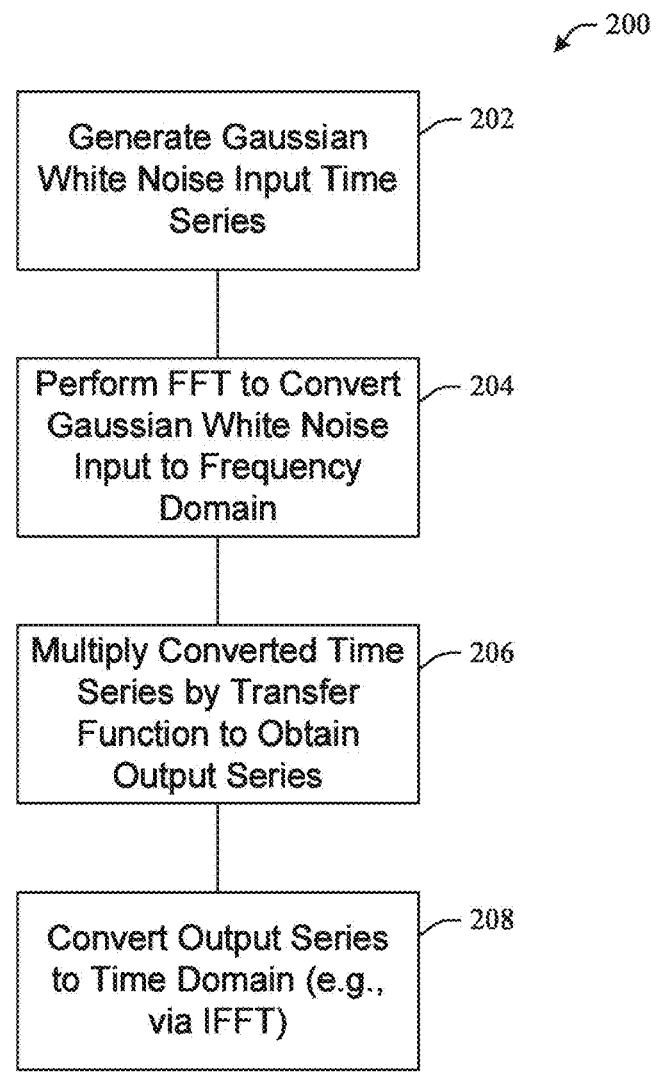
FIG. 2 illustrates a method of generating a synthetic time series with a known scaling exponent in accordance with aspects of the subject innovation.

FIG. 2 illustrates a method 200 of generating a synthetic time series with a known scaling exponent. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

In various aspects, the subject innovation can comprise a method 200 that can generate synthetic time series data with an exact selected scaling behavior and fractional scaling exponent of power over specific frequencies. Method 200 can begin at step 202, wherein a Gaussian white noise time series can be generated (for example, by using a random number generator), which will be used as the input series (or another input series with selected input series scaling behavior). In aspects, the number of points (N) can be selected to be even (e.g., due to indexing effects on the calculation of the Nyquist frequency, as any odd number will raise difficulties calculating the exact Nyquist frequency of f=0.5) and a power of two in order to reduce any issues with the Fast Fourier Transform (FFT) when a power of two is not used (the use of a power of two may depend on the FFT algorithm (e.g., software implementation) employed). The reasoning behind using a Gaussian white noise, also sometimes referred to a persistently exciting white noise, is due to the Central Limit Theorem (CLT) and Spectral Factorization Theorem. A natural system may have several random inputs with or without a Gaussian distribution that, due to the CLT, sum to become one Gaussian white noise process as the input into the system as a whole. Any periodicities desired in the output signal not due to the system can also be generated at this time and added to the Gaussian white noise time series as part of the input signal.

Next, at step 204, a FFT can be performed to convert the Gaussian white noise input time series from the time domain to the complex frequency domain. This can be helpful because the mathematics and calculation of a convolution in the time domain is much simpler in the complex frequency domain becoming multiplication and addition in log space and a convolution can facilitate generation of a synthetic scaling time series. For ease of explanation or visualization, calculations can be done in rectangular notation rather than in polar notion, although the results will be the same in either, and corresponding operations can be performed in polar notation. At step 206, the stochastic input time series with a scaling exponent of β=0 can be multiplied by a transfer function or filter (e.g., a transfer function such as $$\frac{1}{s^{\frac{\beta}{2}}}$$

in rectangular notation that is the equivalent of the behavior of the scaling exponent(s) at each frequency to obtain an output time series. In Bode space in the frequency domain, the scaling exponent of the output is the additive sum of the scaling exponent of the input time series and the scaling exponent of the filter to which the input was multiplied. The result is a synthetic output time series created from the Gaussian white noise input that represents both the correct scaling exponent β over each frequency and the phase shift over each frequency as a time delay from the white noise input to the output signal of the system. At step 208, the output time series can be optionally converted back to the time domain (e.g., via an inverse fast Fourier transform (IFFT)).

FIG. 3 illustrates a table 300 showing the results of evaluation tests run on an example embodiment in accordance with FIG. 2. The derivations have shown that the power law scaling exponent β is indeed part of the underlying mathematics, the internal dynamics of the system, and provides greater understanding of the processes which generated the time series. The synthetic data sets were created in the complex frequency domain to have a predetermined scaling exponent β of power over specific frequencies or over the entire range of frequencies and mathematically represent a time series with all of the properties associated with a specific value of β and scaling behavior. The high degree of accuracy that may be achieved, even with minor variability in the scaling exponent of the Gaussian white noise input signal, is demonstrated in the results of 1000 trials of synthetic data sets generated using the modified Laplace equation incorporating the scaling exponent β which are shown in FIG. 3.

On a side note, using any signal as the input into this method and setting β=2 will integrate the signal (The integration however will treat the input signal as one period of an infinitely long data set so the endpoints should match). Likewise, by setting β=−2, the input signal will be differentiated. Fractional integration (or differentiation) can also be done using this method as well with β=1 being a half-integral, and each multiple of β=2 being an additional integration (e.g., double, triple, etc.) or fractions thereof for odd or non-integer positive β values, and each multiple of β=−2 being an additional differentiation or fractions thereof for odd or non-integer negative β values. Overall, techniques disclosed herein are at least as robust as numerical integration and allow signals such as cosine waves or sine waves to be integrated far beyond what would normally work through numerical integration. Without additional techniques (e.g., preprocessing such as mirroring (e.g., concatenating a forward direction time series with its reverse to ensure endpoint match) or windowing (e.g., Hann window, Welch window, etc.), etc.), the endpoints should meet due to the FFT, which is not what normally occurs upon numerical integration. However, for such functions that are periodic such as a waveform like a cosine wave, the technique arrives at the expected answer, and for other functions, various preprocessing techniques (e.g., mirroring, windowing, etc.) can be applied in situations wherein there is endpoint mismatch.

Figure 4:
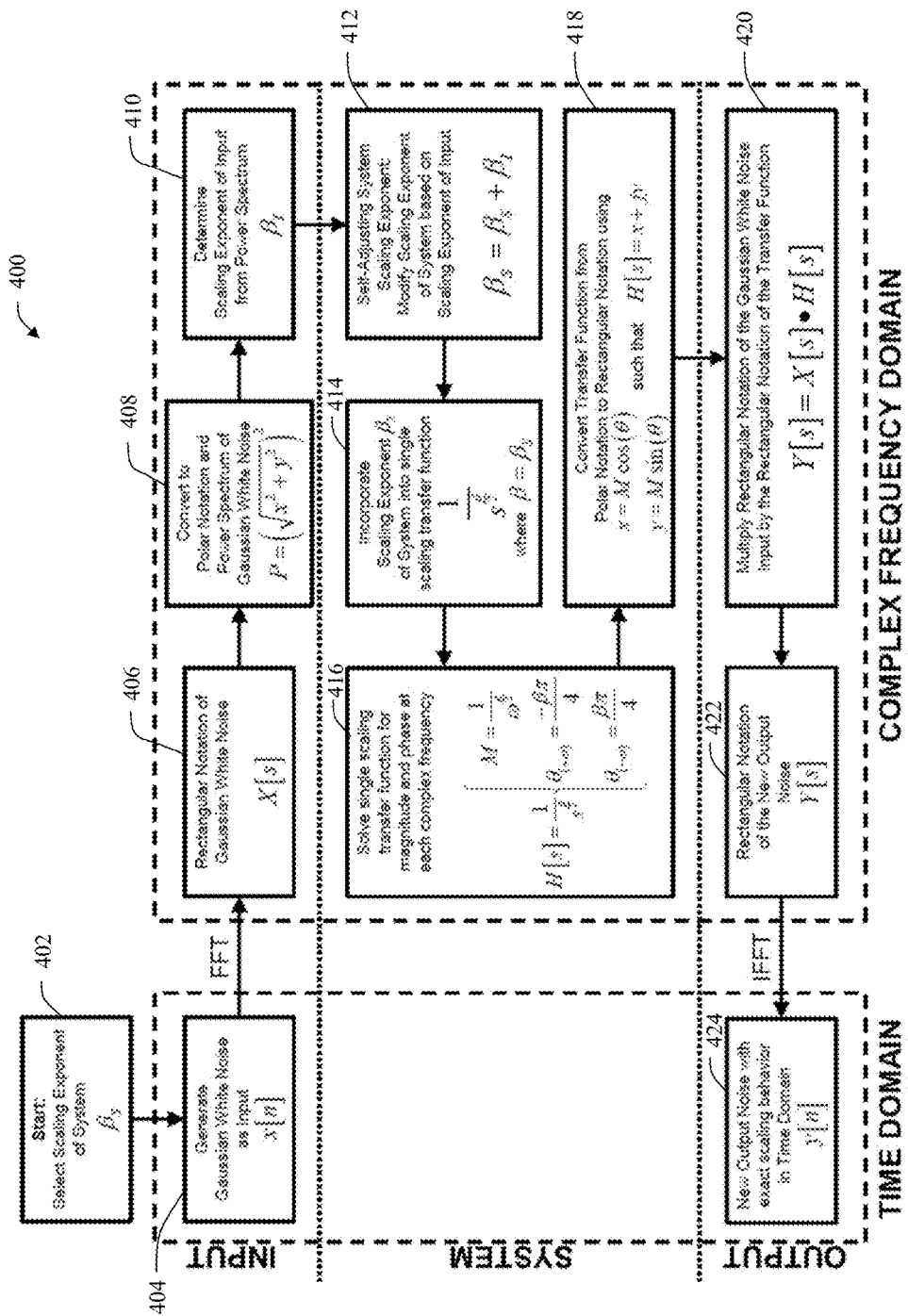
FIG. 4 illustrates a method of generating exact β synthetic data, which can be used as standards, test signals, or otherwise.

FIG. 4 illustrates a method 400 of generating exact $\beta$ synthetic data, which can be used as standards, test signals, etc. Thus far, in creating a synthetic data set using the modified transfer function approach of the subject innovation $$\left(\text{e.g., } \frac{1}{s^{\frac{\beta}{2}}}, \text{etc.}\right),$$

any discrepancies between the desired scaling exponent and the measured scaling exponent were not due to the new method used to generate the synthetic data set, but due to the scaling exponent of the random Gaussian white noise used as an input. In the generation of synthetic data, the measured scaling exponent of the output time series is an exact calculation of the sum of the scaling exponent of the input time series plus the scaling exponent of the filter or transfer function over each frequency. Since the scaling exponent of the filter is directly selected by the user, the discrepancy of the synthetically generated output time series lies in the scaling exponent of the input and is not an artifact of the calculation (scaling exponents of conventionally generated white noise inputs are based on random number generators and have scaling behavior with minor variations such that $\beta$ is not exactly 0; for a desired scaling exponent of $\beta=1$, more variation will occur due to the transition from stationary to nonstationary behavior. However, as described herein, these variations can be eliminated if the scaling exponent of the input signal is incorporated into the signal generation systems and methods disclosed herein.). The realization of the source of the discrepancy between desired and measured scaling exponent allows a minor modification to the synthetic generation methods discussed in connection with FIG. 2 in order to generate an entire class of standardized signals with the ability to create a time series with exact scaling behavior without any decimal noise in the measurement.

In other words, standard scaling signals may be generated in which a desired synthetic time series of, for example, $\beta=2$ is a measured synthetic time series of $\beta=2.0000$ and a desired synthetic time series of $\beta=0$, which may be used as input, is a measured synthetic time series of $\beta=0.0000$ (and similarly for other desired values of $\beta$). This allows for the generation of pure Brownian motion and pure Gaussian white noise, as far as the scaling exponent $\beta$ is concerned, which may be used as benchmarks for a wide variety of digital signal processing methods. Likewise, a synthetic time series of any value of the scaling exponent $\beta$ may now be generated as a standard benchmark with extreme accuracy in scaling behavior. For example, if an application requires a time series with a scaling exponent of $\beta=1.75$, the measured scaling exponent of the synthetic time series will be $\beta=1.7500$ with no additional decimal variation. In order to generate such accurate standards, one must take into account the scaling behavior of the Gaussian white noise used as input.

To be clear, an ideal Gaussian white noise is said to have a scaling exponent of $\beta=0$ over all frequencies. The random number generator will provide a time series of random numbers with a Gaussian distribution of a mean of 0 and standard deviation of 1. In FIG. 3, the values listed for $\beta=0$ are the values of the input time series since, in setting $\beta=0$ in the transfer function equation $$\frac{1}{s^{\frac{\beta}{2}}},$$

there was no change from input to output. With this in mind, FIG. 3, the random number generator does generate a random time series with some minor variation in scaling behavior from $\beta=0$ so that for a Gaussian white noise, the mean of 1000 time series was $\beta_\mu=0.0005$ and the standard deviation of 1000 time series was $\sigma=0.0286$. Knowing this, a modified algorithm such as method based upon the $$\frac{1}{s^{\frac{\beta}{2}}}$$

synthetic data generation method 400 can be employed that will yield synthetic time series with exact measurements of the scaling exponent so that the measured scaling exponent is exactly $\beta$ with no variation in $\beta$ from no matter what scaling exponent is chosen.

To generate one signal or an entire class of standard single scaling exponent signals for any exact value of $\beta$, a method such as example method 400 can be employed, which can be similar to method 200 described above. From the mathematics, the scaling exponent of the input is additive to the scaling exponent of the system (the scaling exponent $\beta$ in the equation $$\frac{1}{s^{\frac{\beta}{2}}}).$$

Thus, if the scaling exponent of the input is taken into account prior to convolution with the system, the scaling exponent of the system may be slightly modified so that upon convolution, the output time series yields exactly the scaling exponent that was selected, accurate to at least 10 decimal places (at which point there are slight rounding errors in the calculations).

Method 400 is one example method useable to generate exact values of $\beta$ in a synthetic time series. Method 400 can begin at 402, by selecting an initial scaling exponent of the system $\beta_{SO}$, which can be a target scaling exponent $\beta_O$ for an output series, etc. (e.g., for white noise output, $\beta_O=0$; for Brownian motion, $\beta_O=2$; etc., including any positive or negative decimal values of $\beta$). At step 404, a Gaussian white noise can be generated as input using a random number generator. Unlike method 200, in the modified algorithm to create standard time series with exact scaling behavior, once the Gaussian white noise input signal is converted from the time domain to the complex frequency domain, shown at 406, using the FFT, as an additional step, the scaling exponent of the Gaussian white noise input signal can be determined from fitting a power law to the power spectrum, as seen at 408. At 410, the scaling exponent of the input signal can be determined, and with the scaling exponent of the input signal known, any scaling exponent may be generated as output. At 412, the scaling exponent for the system $\beta_S$ can be adjusted to the target scaling exponent for the system $\beta_{SO}$ based on the known scaling exponent of the input, $\beta_I$, so that the revised scaling exponent of the system, $\beta_S$, will compensate for discrepancies in $\beta_I$ and yield the target scaling exponent $\beta_{SO}$ as the scaling exponent of the output series $\beta_O$ for the near white noise input $\beta_I$. At 414, this adjusted scaling exponent $\beta_S$ can be incorporated into the transfer function of the system $$\left(\text{e.g., } \frac{1}{s^{\frac{\beta}{2}}},\right.$$

where $\beta=\beta_S$). Thus, at 412 and 414, a smart transfer function can be created which self-adjusts the scaling exponent on the Laplace operator based on the scaling exponent of the input signal to achieve the target scaling exponent $\beta_{SO}$. Since the scaling exponents of the input $\beta_I$ and system $\beta_S$ are additive, it is only necessary to take into account the effect that the scaling exponent of the input signal will have in the convolution. As such, no matter what the scaling exponent of the input signal is, the scaling exponent of the system may be slightly modified so that the resulting scaling exponent of the output signal is the target scaling exponent.

For example, if a Brownian motion time series is desired with an exact scaling exponent of $\beta_O=2.0000$ and the scaling exponent of the Gaussian white noise input signal is found to be $\beta_I=0.0125$, the value of $\beta_S$ used in the transfer function equation $$\frac{1}{s^{\frac{\beta}{2}}}$$

can be set to $\beta_S=1.9875$ instead of $\beta_S=2$. The value of the scaling exponent of the system $\beta_S$ can be set to the target scaling exponent $\beta_{SO}$ minus the scaling exponent of the input $\beta_I$ so that upon addition with the convolution of the input and transfer function, the output scaling exponent $\beta_O$ is the exact target scaling exponent $\beta_{SO}$. For further clarity of the example, the target output scaling exponent of $\beta_{SO}=2$ minus $\beta_I=0.0125$ equals the scaling exponent $\beta_S=1.9875$ needed in $$\frac{1}{s^{\frac{\beta}{2}}}$$

to achieve the target scaling behavior of the output as $\beta_O=2.0000$ given that exact input.

At 416, the transfer function can be solved for magnitude and phase at each complex frequency based on the adjusted scaling exponent $\beta_S$, and at 418, the transfer function can be converted from polar notation to rectangular notation. Once the parameters of the system have been modified by the scaling exponent of the input signal as in steps 412-418, the input signal can be multiplied by this corrected transfer function (e.g., in rectangular notation) at 420 to obtain the output signal (e.g., in rectangular notation) in the frequency domain, as seen at 422. When the results are passed back to the time domain through the IFFT as seen at 424, the new synthetic time series will yield exactly the scaling behavior that was desired with extreme accuracy. For reference, methods such as method 400 (to obtain extremely accurate signals as standards, test signals, etc.) are referred to as standardized transfer function methods, in which the parameters of the transfer function are corrected based upon the scaling behavior of the input signal prior to convolution with the same input signal. A standardized transfer function method such as method 400 may be used to generate both single scaling and multiscaling time series.

Figure 5:
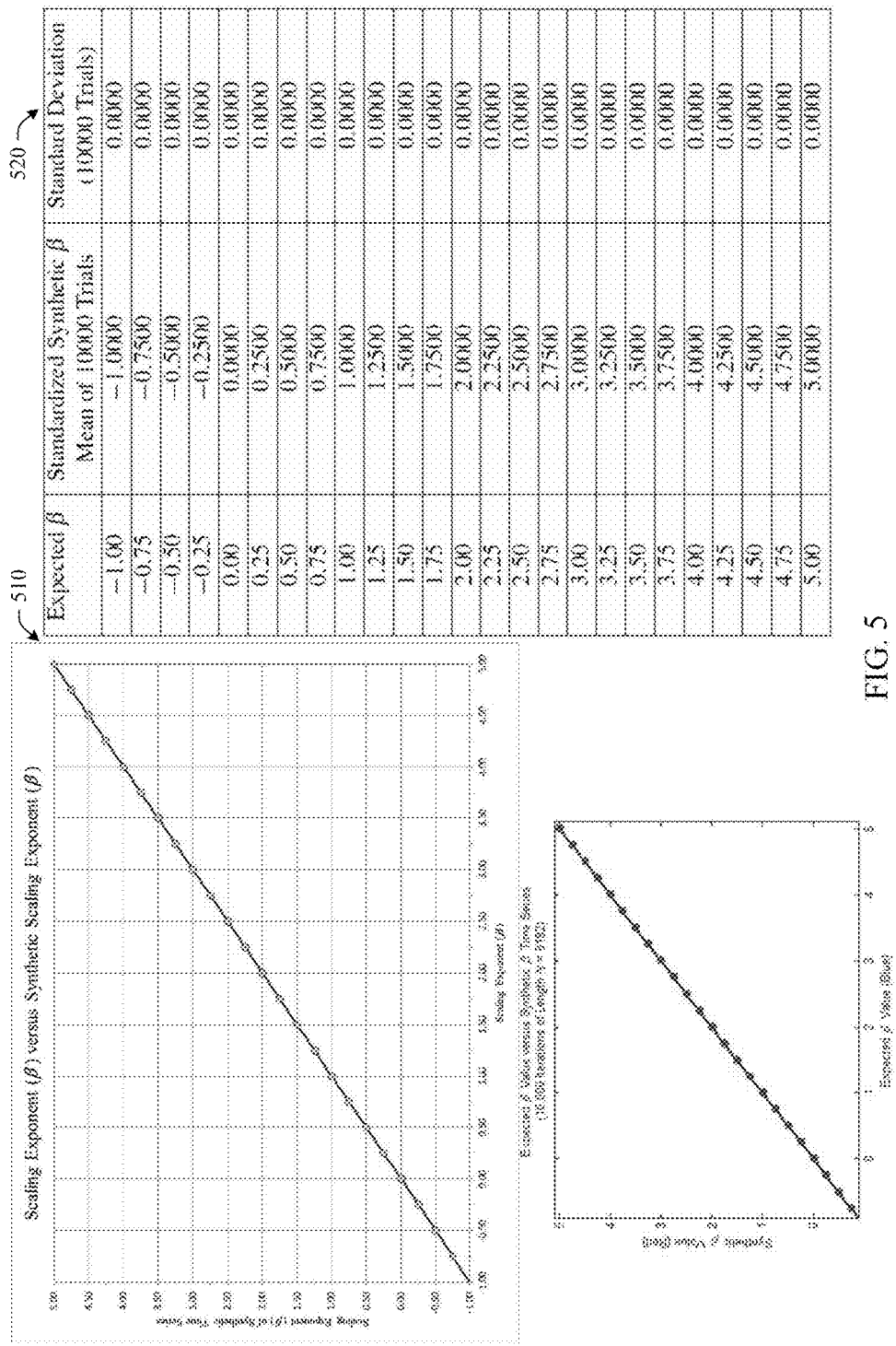
FIG. 5 illustrates the results of synthetic time series generated with selected scaling behavior.

To fully demonstrate that this standardized transfer function method produces synthetic time series with exact scaling behavior which may be used as standards for testing methods or as test signals in digital signal processing, a total of 10000 synthetic time series (length N=8192) were generated for each value of $\beta$ from $\beta=-1$ to $\beta=5$ in 0.25 increments using the standardized transfer function approach that introduces input scaling exponent corrections into the parameters of the transfer function. The mean and standard deviation was then calculated of all 10000 synthetic time series for each value of $\beta$. The results are summarized in FIG. 5 in chart 510 and table 520. From these results, the scaling exponent that was expected (the target scaling exponent) is achieved in all cases for all values of $\beta$ from $\beta=-1$ to $\beta=5$ with the mean of all 10000 time series being the same for each value of $\beta$. The standard deviation for each value of $\beta$ was $\sigma=0.0000$ of all 10000 synthetic time series meaning that the standardized transfer function method correctly generates a synthetic time series with the exact scaling behavior at every instance. Additionally, the fact that 10000 synthetic time series can be made with scaling behavior with absolutely no variation from the standard deviation of $\sigma=0.0000$ suggests that the mathematics of $$\frac{1}{s}$$

noise is completely deterministic given a known stochastic input. A flowchart of the standardized transfer function method is found in FIG. 4, and discussed above.

The synthetic time series produced with the standardized transfer function method are pure signals given the lack of variation among 10000 trials per value of $\beta$ and may be used as inputs themselves into a transfer function. The standardized transfer function method (e.g., as in example method 400) allows for the generation of very clean input signals which can be used as inputs into complex, multiscaling transfer functions when generating any synthetic data from the Frequency Response Model of a natural system, ensuring that the scaling behavior of the synthetic time series is consistent, always the same, and repeatable. For example, if one would like to generate a synthetic natural time series that always will yield the same scaling exponents (over the same range or ranges of frequencies) as the original, then the standardized transfer function method may first be used setting the desired scaling exponent to $\beta=0$ in order to produce a pure standard Gaussian white noise signal with $\beta=0.0000$. Then, this standard Gaussian white noise signal may be used as the input signal, with included periodicities, convolved with the transfer function of the system to ensure that no variation was introduced into the synthetic output time series by the variation of the scaling behavior of the input and that any variation in scaling which is observed will be entirely due to parameters set in the transfer function of the Frequency Response Model. For single scaling time series or a multiscaling time series, the process is exactly the same in that the transfer function may be convolved with a standardized Gaussian white noise signal with added periodicities so that scaling behavior appearing in the synthetic output is due to the scaling and shifting of the random number input as set by the parameters used in the transfer function, not due to minor variations in the scaling behavior of the input signal.

Additionally, the standardized transfer function method (e.g., as in example method 400) may be used for any input into the system allowing the scaling parameters of the system to be modified by the input so that the desired result is achieved. Thus, if an input signal does exhibit any variability in the scaling exponent as does the generation of Gaussian white noise using a random number generator, then the scaling behavior of the input may be monitored so that the parameters in the system actively change with the changing input so that the output is always scaling according to the desired value of the scaling exponent β. In essence, the standardized transfer function method is fractional integration (or differentiation) of the input signal, with the corrections to the parameters of the transfer function of the system (the filter) based upon the scaling behavior of the input signal, in order to achieve the exact scaling behavior necessary in the output signal. Viewed in this context, the standardized transfer function method has the ability to take an input signal with a constantly changing scaling behavior and to covert this signal to a consistent output based on continuous modification of the transfer function with the input signal. For example, if an input signal is fluctuating between low and high frequencies events so that there is white noise of β=0 mixed with periods of red noise at β=1 and only white noise is the target output, the scaling parameters of the transfer function of the system may be corrected (in near real-time) based on the changing scaling behavior of the input to yield only white noise output with β≈0.0 eliminating the effects of the variable input into the system. Thus, the standardized transfer function method may be employed in connection with smart filters or transfer functions that self-adjust based upon the scaling behavior of input into the filter.

A standardized transfer function method, such as example method 400, has numerous potential applications. The newly modified Laplace equations discussed herein, can be incorporated into new methods (e.g., as computer software algorithms, etc.) to allow for the generation of highly accurate, clean noise signals (exact with no decimal noise errors) for testing which can be used as either a test signal or a clean input signal. In addition to software implementations, these algorithms may be incorporated directly into a physical device as a Pure Noise Generator to produce any color of noise. Noise generators are common in laboratories in the fields of physics, electrical engineering, digital signal processing, and audio signal processing, and also found in a number of other industries such as aerospace, manufacturing, computer, and medicine. Additionally, pink noise is used for audio room equalization so the subject innovation can provide for enhanced audio room equalization, via more accurate noise for receivers and sound systems. One other application is for generation of any color of noise used in noise apps on smartphones, tablets and other devices, which have become increasingly popular in recent years. The subject innovation can produce mathematically correct noise with no errors and no loss of data, and also can generate the noise of specific environments based on the transfer function of that environment. In contrast to white noise generated using a skew correction algorithm devised by John von Neumann which is inefficient due to loss of three quarters of the data, systems and methods of noise generation in accordance with aspects of the subject innovation can produce corrected noise with no loss of data.

Figure 6:
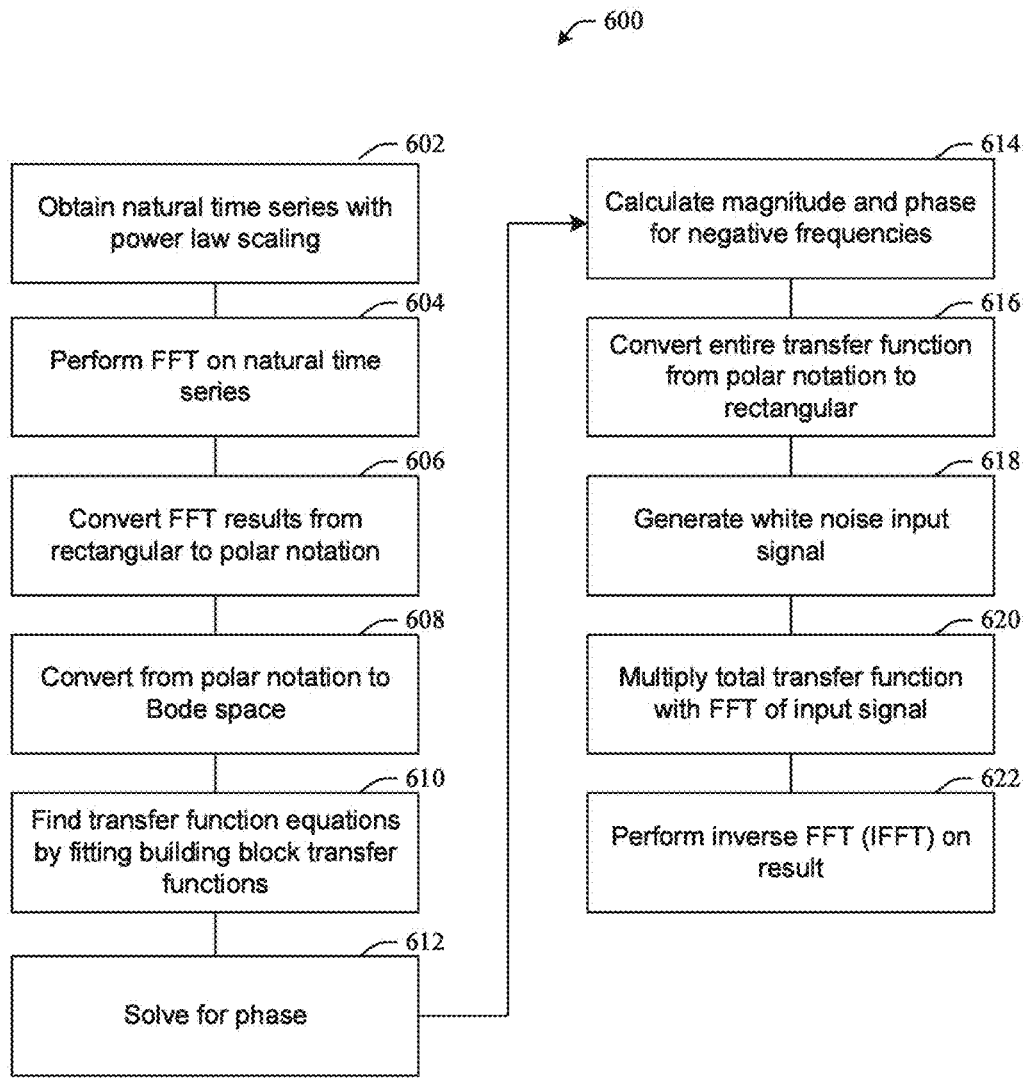
FIG. 6 illustrates an example method that can generate a synthetic time series that emulates a natural time series with accurate scaling behavior over all frequencies.

In further aspects, the subject innovation can provide for creation of synthetic natural times series. FIG. 6 illustrates an example method 600 that can generate a synthetic time series that emulates a natural time series with accurate scaling behavior over all frequencies. First, a scaling exponent transfer function of the original time series that is to be synthetically simulated can be obtained, before the transfer function may be used to generate synthetic time series. Once the transfer function of a time series is obtained, the transfer function can be used to simulate that time series for any length data set (even increasing the length beyond that of the original time series is fairly accurate, since the sampling interval is presented in the Nyquist frequency and a longer data set merely adds frequencies that are already encapsulated by the scaling exponent. Even a four or five fold increase in the length of the synthetic time series may still be expected to keep the scaling exponent of the original frequencies intact and generate an accurate synthetic time series). Method 600 can continue as follows to find a transfer function and generate synthetic data. At 602, a natural time series that contains power law scaling can be obtained, and at 604 a FFT can be performed on the time series to convert from the time domain to the frequency domain. For any natural time series with stochastic behavior, preprocessing may be used as required to correct for endpoint mismatch or gaps in the data prior to the FFT. At 606, the result of the FFT can be converted from rectangular to polar notation (from cosine and sine amplitudes to magnitude and phase at each positive, negative, and Nyquist frequency).

At 608, the results can be converted from polar notation (of magnitude) into Bode space by converting magnitude to decibels as 20 log dB (magnitude) and plot decibels on the y-axis versus ω (angular frequency) on the x-axis of a Bode plot. The slope(s) defining the scaling exponent(s) β or locations of any breaks (k) in slope of the power spectrum are the same as the Bode plot of the same data, when plotted as decibels of power, and provide a framework for selecting which Laplace equations are needed to begin fitting the data. As used herein, the Bode plots are plotted in terms of decibels of power and not magnitude, as is customary in Bode magnitude plots, preserving the scaling behavior of the power spectrum. However, the transfer functions are fit in terms of magnitude, which is half of the slope as β/2 of the power scaling exponent β, whereupon the magnitude frequency response of the transfer functions are then squared and converted to decibels of power using 20 log dB (power).

Figure 7:
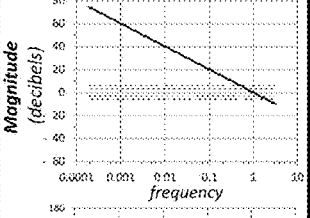
FIG. 7 illustrates three basic building block transfer functions.

Next, at 610, the transfer function equations can be found by fitting one or more of the six basic building block transfer functions shown in FIG. 7 or 8 to the graph of the data. For a multiscaling series, different building blocks can be fit to different frequency regions depending on the specific scaling behavior of those frequency regions. When choosing the transfer function, the fit is first based on the activity (scaling exponent β and gain (k) if any) at the low frequencies and how and where the slope changes as the frequencies increase towards high frequencies. Any flat portion within the Bode plot (or power spectrum) will require a reversal of the current slope, usually with an opposing equation. For example, an integrator or a low pass filter may be effectively canceled with a high frequency amplifier of the same scaling exponent β to create the flat spectrum. The equations graphically add in Bode space making the selection of transfer functions fairly straightforward. The total transfer function is the sum of all transfer functions for each section of the Bode plot.

The original Laplace transfer functions all contain integer exponents on the Laplace operator (s). For increased accuracy, a fractional scaling exponent was substituted in aspects of the subject innovation for the integer exponent on the Laplace term (s). The equations in FIGS. 7 and 8 are already solved in terms of β for each original ordered equation, but if solved manually, one should ensure that the relationship of β to power is preserved for first order (using β/2) and second order (using β/4) equations. FIG. 9 illustrates various fundamental forms of the basic building blocks.

In determining that the correct value of β is used in the transfer function equation of each scaling region if multiple scaling exponents are present, the possibility exists that the scaling exponent used in the transfer function might not be the exact scaling exponent that was fit to the power spectrum with a power law trend line due to the relative rate of change in slope at the gain (k) and the interaction and type of transfer functions used to define a certain frequency range. For example, to achieve an abrupt change in slope that lasts only over a short range of frequencies, a higher value of β may be necessary in the transfer function than was suggested by the power spectrum which is then canceled out by a reciprocal transfer function equation for which the overall effect is the interaction of each equation generating the scaling exponent that was initially measured in the power spectrum over that range of frequencies. This is because transfer functions such as a low or high pass filter generally do not change slope abruptly when the scaling exponent is low and in order to achieve the correct change in slope over the correct range of frequencies, a higher scaling exponent may be used to increase the rate of change of the slope.

The transfer function represents the Frequency Response Model of the system and represents the black box capturing how the system will respond to any input (assuming Gaussian white noise input originally). If using stochastic input, a synthetic time series simulating the original can be generated. The FRM also allows further applications with predictive qualities to be developed. As a predictive tool, the FRM may be tested with various inputs to demonstrate how modifications to the inputs may impact the output of the system, predict the output of the FRM given a known input, and allows time delays to be calculated for all frequencies based on the scaling exponent at each frequency.

The transfer function equation for the line fit to the data as described above is the magnitude only, so at 612, each part of the equation for phase (θ) can be solved as well via either the solved equations in FIGS. 7 and 8 or $$\theta = \tan^{-1}\left(\frac{y}{x}\right).$$

Note that while the phase for each transfer function should be solved individually, the phase of each transfer function is added to create a total phase response. This is the phase response for the entire FRM of the positive frequencies.

At 614, even and odd symmetry can be preserved by calculating the magnitude and phase for the negative frequencies. The magnitude will exhibit even symmetry about the Nyquist frequency and has no change in sign but the phase will experience odd symmetry about the Nyquist frequency and must change sign when transitioning to the corresponding negative frequencies by multiplying the phase value at each positive frequency by −1. The phase should be in radians with a phase of 0 at the first index value of frequency and a phase of 0 at the Nyquist frequency, as in FIGS. 7 and 8. Since the total transfer function is in decibels, conversion from decibels back to magnitude is necessary using the following equation at each frequency:

$$M = 10^{\left(\frac{Decibels}{20}\right)}.$$

At 616, the entire transfer function, currently in magnitude and phase, can be converted from polar to rectangular notation (i.e., from magnitude and phase to complex numbers) for each positive and negative frequency using the conversions x=M cos θ and y=M sin θ.

At 618, a Gaussian white noise input signal of the selected length can be generated, which can include any periodicities that originate outside the system that are present in the data. This input signal can be generated via conventional techniques. Alternatively, a standardized Gaussian white noise signal with β=0.0000 can be generated in place of a regular Gaussian white noise using the standardized transfer function method described in connection with example method 400, and any periodicities originating outside the system can be added to that standardized Gaussian white noise. To generate an input signal for an example system, a white noise stochastic time series can be generated with a random number generator and correctly scaled (in amplitude, length, and frequency) periodicities were added. One method to add periodicities is to create sine waves (with some minor noise to slightly broaden the peak) at the corresponding frequencies and just add all sine waves representing these periodicities to the stochastic time series input. In modeling the Great Lakes, as discussed below, a low frequency yearly periodic component and two high frequency components, a 12 hour 25 minute periodicity and a 24 hour daily cycle, were added to the white noise input to generate the total input signal. The total input signal was then passed through a FFT to convert the input signal from the time domain to the complex frequency domain. The results were complex numbers in rectangular notation and no further conversion is necessary since all calculations will take place in rectangular notation.

At 620, the complex numbers (in the form (x+jy)) of the total transfer function from step 616 can be multiplied in rectangular notation by the complex number results of the FFT of the total input signal in step 618 for each frequency, both positive and negative, to obtain the output signal in the frequency domain. This performs the equivalent of a time domain convolution of the input signal with the system filter and since the calculations are performed in the frequency domain, a new set of complex numbers will be generated as output, and ensure that the even (cosine) and odd (sine) symmetry will be preserved.

At 622, an Inverse Fast Fourier Transform (IFFT) can be performed on the complex frequency domain output obtained in the complex number results of step 620. The real numbers alone can be selected to omit any round-off errors (if even and odd symmetry was preserved, there should be no significant numerical values to the imaginary numbers, and in most cases, they will be close to zero and omitted; if not close to zero, the calculations should be re-examined to ensure symmetry of the complex numbers passed into the IFFT). As long as symmetry was preserved, the synthetic time series generated by the IFFT represents the output of the system. The synthetic data set represents the same scaling behavior and same basic statistical measures as the original natural self-affine time series. Of course, the amplitude of changes is relative to the range of the input data. However, if the data was normalized, the new time series, which contains the same scaling behavior as the original, can be adjusted to reflect the actual data by multiplying each value by a rescaling factor to adjust the range to be the same as the original and then adding the synthetic data to the mean of the original data set. The end result will be a synthetic data set with the same mean, range, periodicities, and scaling behavior at all frequencies as the original time series and since the synthetic time series was generated with stochastic numbers as input, represents one possible instance of the output of a large system in which the input is a Gaussian white noise due to the Central Limit Theorem. For stochastic data sets, even if the inputs were not white noise such as the case may be for small systems, by finding the transfer function of a time series under the assumption that the inputs are white noise, and then using white noise as the input signal to synthetically generate a time series, a synthetic time series will be generated that will have the same power spectrum as the original time series. Thus, even if the transfer function does not accurately reflect the system, possibly because the output time series is an interaction of the input time series and the system, as long as the transfer function is built from the power spectrum of the output of the system, synthetic data sets generated using the FRM will be statistically identical to the original time series.

As such, aspects of the subject innovation can generate synthetic data sets with exact scaling behavior via the modified transfer function approach disclosed herein $$\left(e.g., \frac{1}{s^{\frac{\beta}{2}}}\right).$$

Data sets generated in this manner can have exact increases in scaling behavior from input to output based on the scaling exponent and transfer function(s) used as system filter and frequency response model.

There are a wide range of potential applications of embodiments of the subject innovation, such as in environmental science, audio signal processing, electrical engineering, computer-generated imagery, medical applications, and others. The following example applications are provided for the purposes of illustration.

Systems and methods of the subject innovation can be incorporated in Digital Signal Processing (DSP) by modifying conventional DSP techniques to provide for greater accuracy.

Since embodiments of the subject innovation can be used to synthetically reproduce changing natural environments through time, they can be used in climate models, water level models, or in simulation of any natural stochastic system. For example, the new algorithms may be used to simulate water level behavior over 30 years to ensure that any new construction at the shoreline is at a safe elevation relative to the time frame of interest, which also has potential benefits for the insurance industry for purposes of determining possible risk in a flood zone.

Additionally, the movie and gaming industry has potential applications, since the subject innovation can produce more accurate and realistic computer models of natural environments through computer-generated imagery, which may be expanded from 1D to more precise fractal-like synthetic 2D images and 3D textures, much as Perlin Noise is used in movies. The subject innovation can increase realism of the simulations produced in video games and movies.

Techniques of the subject innovation also have military applications such as in the development of smart data filters to streamline data analysis, e.g., through more effective noise elimination leaving the signal of interest intact. Other potential military applications include Adaptive Camouflage Systems in which the background environment is sampled, a robust quantitative Frequency Response Model of the background is generated using the new algorithms, and the target may then take on the characteristics of the background through a synthetically generated fractal-like signal, image, or texture which is statistically identical to the background effectively hiding the target. Similar techniques can be used to generate more effective passive camouflage for specific environments.

In audio signal processing and medicine, techniques of the subject innovation can be incorporated into a hearing aid or other device for the digital signal processing of speech signals. Through enhancements to the current hearing aid A-Weighting algorithms, using the newly developed algorithms in assessments of hearing damage, a hearing aid may be tailored specifically to the hearing loss of an individual where the new algorithms may be used in the creation of a smart digital filter specific to that individual to amplify only the damaged frequencies based upon continuously variable input sounds from the environment. In communications systems, Fractional Scaling Digital Filters may be used to enhance current methods of transmission, storage, synthesis, verification, identification, and recognition of speech signals and to improve signal quality in the digital signal processing of speech signals.

The application of the fractional mathematics of $$\frac{1}{s}$$

noise to human behavior, cognitive science, and neuroscience has great potential to refine current analytical tools and methods used to assess and understand the underlying dynamics of human data. Concepts of $$\frac{1}{s}$$

noise as employed in aspects of the subject innovation may be employed in the behavioral sciences to provide a principled standardized methodology building a strong foundation of robust mathematical and quantitative tools to address a variety of aspects of human behavior from quantifying movement to modeling human performance data. In neuroscience, $$\frac{1}{s}$$

noise has the capability to address characteristics of human information processing, enhance the collection and analysis of brain and nervous system signals, and allow for the development of more accurate sensors used to record electrical activity, such as EEG data, through enhanced filtering equations.

In various embodiments, the subject innovation can comprise systems, methods, and articles (e.g., FPGA device, DSP chipsets, etc.) that can encode one or more possible forms of the six building blocks shown in FIG. 7 or 8, or any of the 11 fundamental forms shown in FIG. 9. In various embodiments, the subject innovation can comprise a DSP chipset, wherein each such chipset can encode one or more of the fundamental forms shown in FIG. 9, along with associated parameters of the filter (β, gain, k, and damping coefficient, d, if necessary). Such embodiments can provide fractional DSP chips, in contrast to conventional DSP chips employed in the fields of electronics and electrical engineering. In one application, fractional DSP chips such as these can also improve sensors, for example, as potential enhancements of the bioelectrical interface, to better interpret bioelectrical signals.

Alternatively, an entire system, such as the example Great Lakes transfer function discussed herein (or substantially any other stochastic system, etc.), could be encoded on to a FPGA device or DSP chip, so that the FPGA device or DSP chip contains an accurate filter for a specific system which exhibits fractional scaling behavior.

Additionally, alternative forms of each filter using just the phase or just the magnitude can be encoded on a FPGA device or DSP chip. For example, by encoding only the magnitude portion of the equation, scaling occurs according to the scaling exponent β at each frequency, but no phase shift occurs. Many conventional methods run the filters forward and backwards to eliminate the phase shift of the filter. By just using the magnitude portion of the fractional scaling digital filter, amplification and/or attenuation can be performed on a signal without having to account for the phase shift, eliminating a step, thereby increasing efficiency and making circuits faster. Likewise, by encoding only the phase portion, no scaling will occur but the phase will shift at each frequency according to the scaling exponent β at each frequency. In various embodiments, the subject innovation can include FPGA devices, DSP chips, and chipsets employing one or more building block functions that can be either a complete function performing scaling in magnitude and shifting in phase, or a partial function performing either scaling in magnitude only without phase shifting or phase shifting only without scaling in magnitude. Industries that rely on highly accurate test signals, Bode analysis, or Frequency Response Models will benefit from the new computer algorithms. For example, a Lock-in Amplifier uses a steep low pass filter to extract a signal from noise. However, sometimes, the noise obscures the signal. Through the application of the subject innovation and the new algorithms employed herein, low pass fractional scaling digital filters may be used in a Lock-in Amplifier further enhancing the critical gap of signal to noise allowing for greater discrimination of the signal from the noise.

There are many more potential areas where the new methods can be introduced to enhance current methods from maritime applications such as improving SONAR and RADAR systems to astronomical applications such as filtering radio telescope signals.

Figure 10:
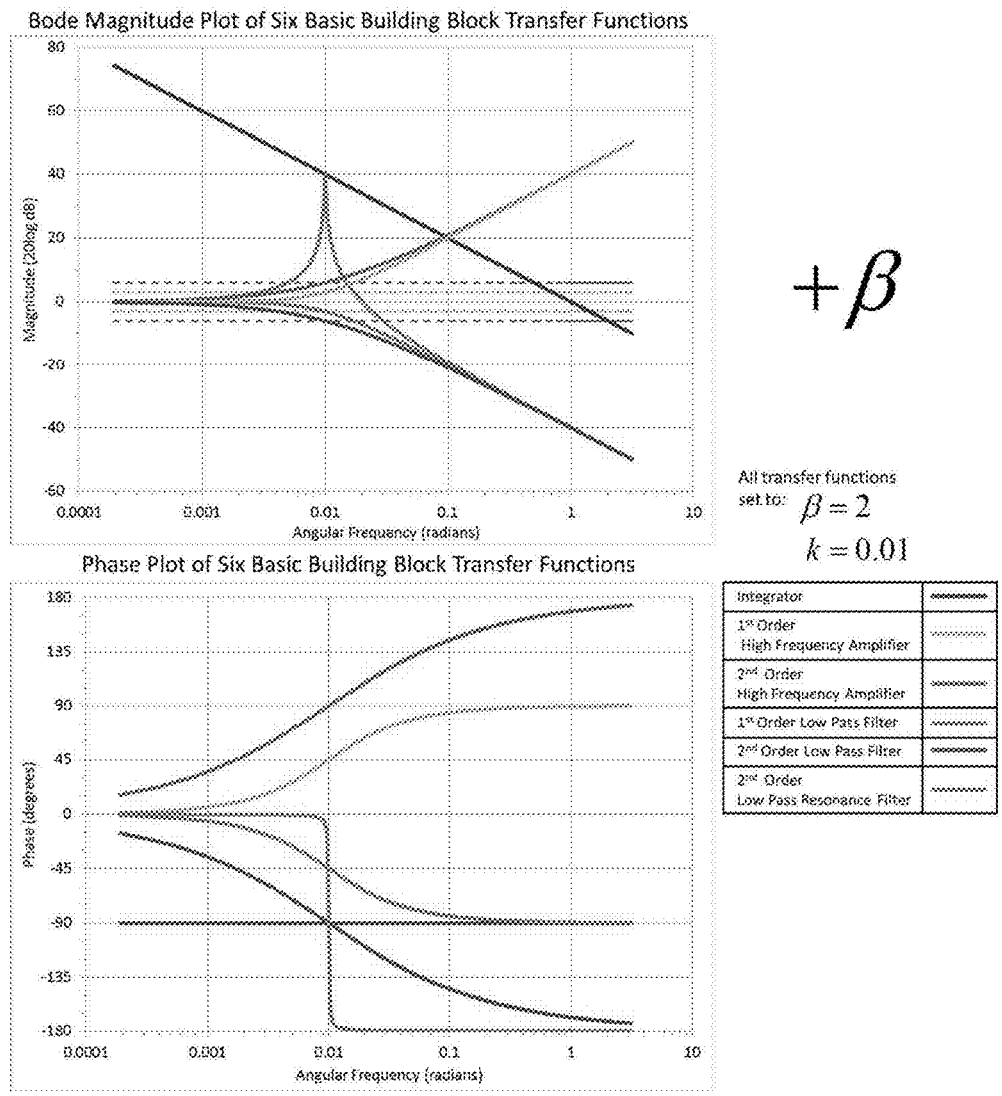
FIG. 10 illustrates Bode magnitude and phase plots of six basic building block transfer functions representing six of the eleven fundamental forms, each with a positive scaling exponent (+β) set to β=+2 with a gain of k=0.01 if present.

FIG. 10 illustrates Bode magnitude and phase plots of six basic building block transfer functions representing six of the eleven fundamental forms, each with a positive scaling exponent (+β) set to β=+2 with a gain of k=0.01 if present. In the resonance equation only, $d=2.5\times10^{-5}$. In the Bode magnitude plot, the red dotted lines are at ±3 dB and the blue dashed lines are at ±6 dB.

Figure 11:
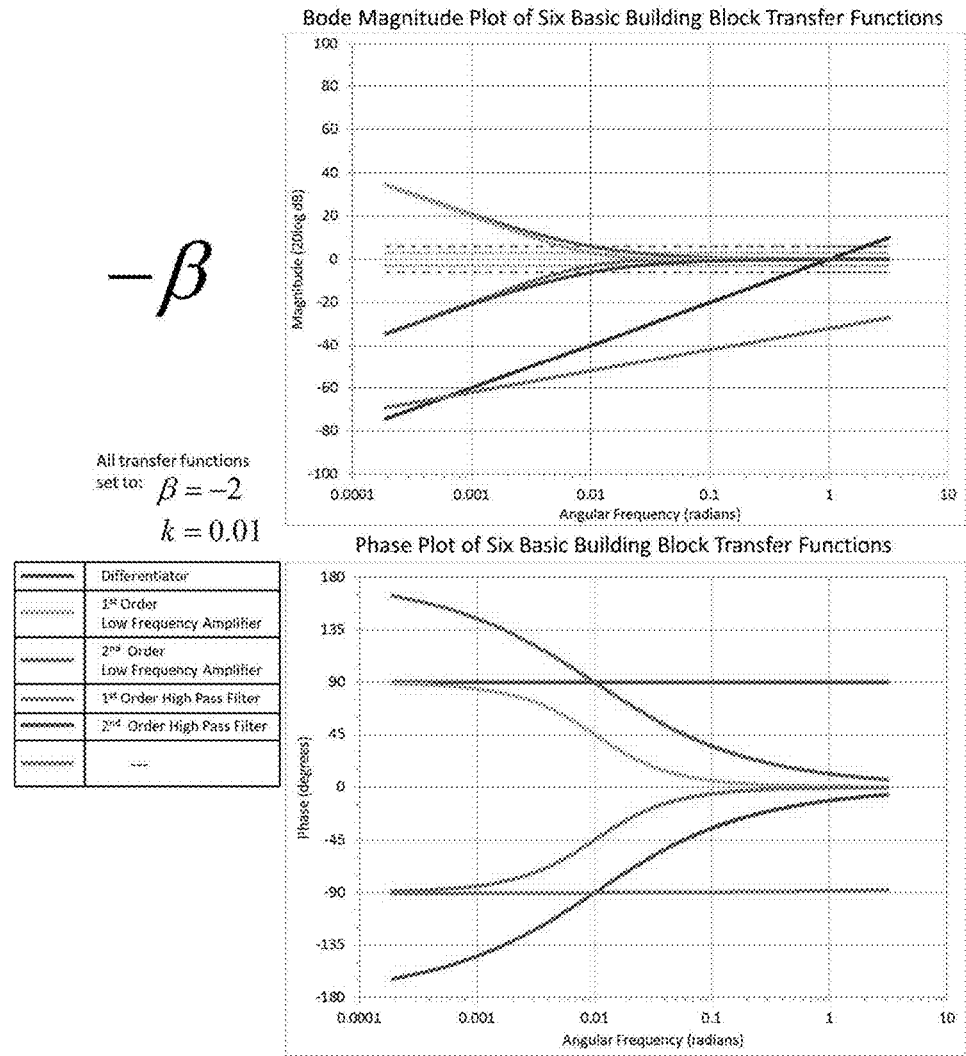
FIG. 11 illustrates Bode magnitude and phase plots of six basic building block transfer functions representing five of the eleven fundamental forms (the resonance equation is no longer valid), each with a negative scaling exponent (−β) set to β=−2 with a gain of k=0.01 if present.

FIG. 11 illustrates Bode magnitude and phase plots of six basic building block transfer functions representing five of the eleven fundamental forms (the resonance equation is no longer valid), each with a negative scaling exponent (−β) set to β=−2 with a gain of k=0.01 if present. In the resonance equation only, $d=2.5\times10^{-5}$ although the resonance equation no longer produces a resonance peak at k. In the Bode magnitude plot, the red dotted lines are at ±3 dB and the blue dashed lines are at ±6 dB.

Figure 12:
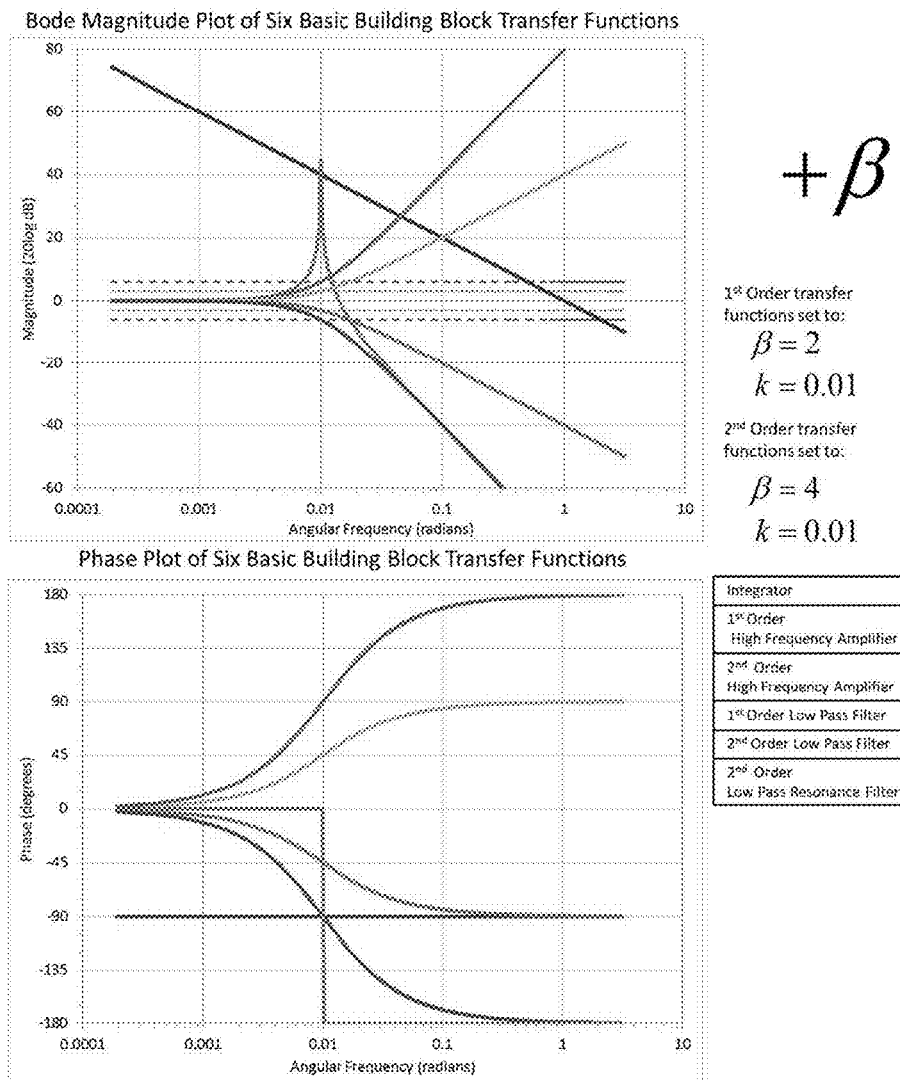
FIG. 12 illustrates Bode magnitude and phase plots of six basic building block transfer functions representing six of the eleven fundamental forms, each with a positive scaling exponent (+β) set to β=+2 in first order forms and β=+4 in second order forms, with a gain of k=0.01 if present.

FIG. 12 illustrates Bode magnitude and phase plots of six basic building block transfer functions with positive scaling exponents (+β) representing six of the eleven fundamental forms. The first order forms are set to β=+2 with a gain of k=0.01 if present and the second order forms are set to β=+4 with a gain of k=0.01 and, if present, $d=2.5\times10^{-5}$. In the Bode magnitude plot, the red dotted lines are at ±3 dB and the blue dashed lines are at ±6 dB.

Figure 13:
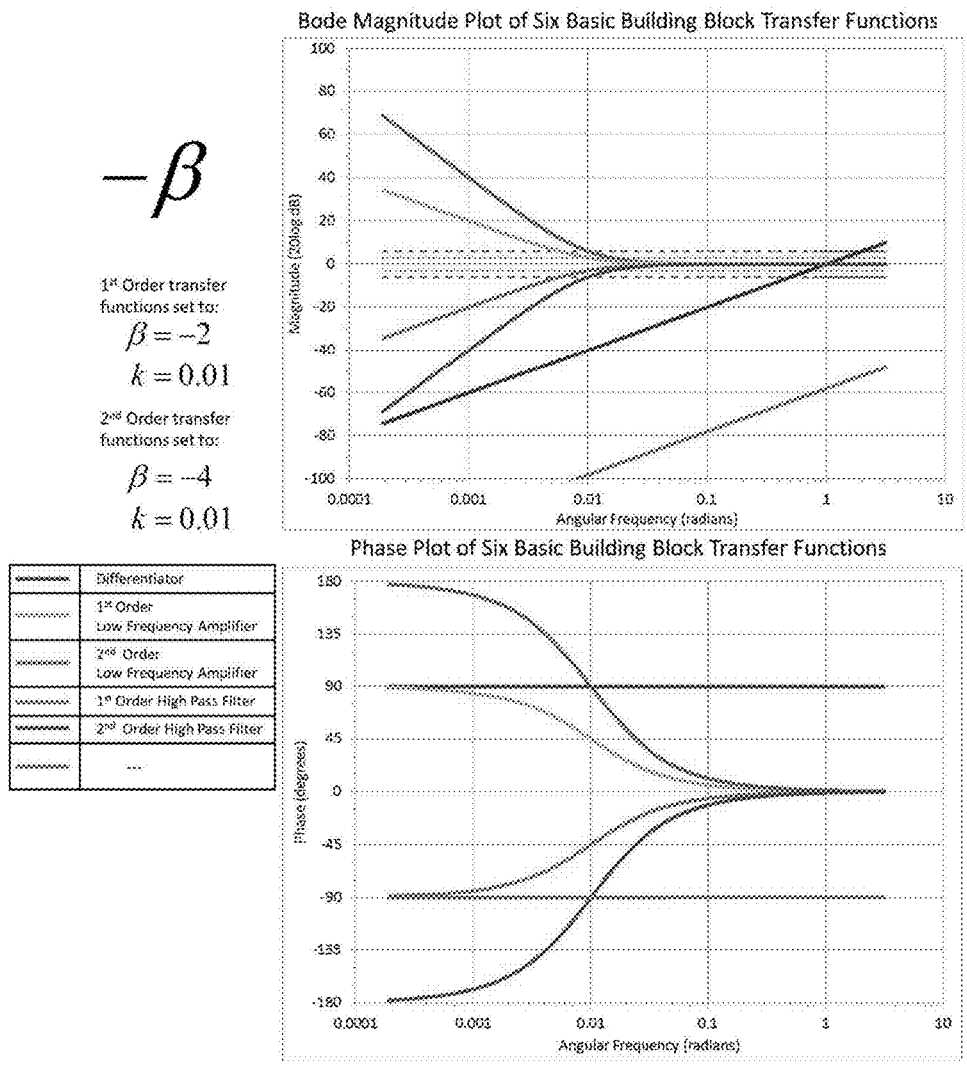
FIG. 13 illustrates Bode magnitude and phase plots of six basic building block transfer functions representing five of the eleven fundamental forms (the resonance equation is no longer valid), each with a negative scaling exponent (−β) set to β=−2 in first order forms and β=−4 in second order forms, with a gain of k=0.01 if present.

FIG. 13 illustrates Bode magnitude and phase plots of six basic building block transfer functions with negative scaling exponents (−β) representing five of the eleven fundamental forms (the resonance equation is no longer valid). The first order forms are set to β=−2 with a gain of k=0.01 if present and the second order forms are set to β=−4 with a gain of k=0.01 and, if present, $d=2.5\times10^{-5}$ although the resonance equation no longer produces a resonance peak at k. In the Bode magnitude plot, the red dotted lines are at ±3 dB and the blue dashed lines are at ±6 dB.

The following is an overview of the mathematics behind various aspects of the subject innovation, as well as supporting examples and data.

A time series which exhibits nonlinear scaling, such as power law scaling observed in natural stochastic signals such as the Great Lakes water level data, may be considered within the context of Control Theory. In traditional Control Theory, inputs and outputs of a system are related by one or more differential equations. From the power spectrum of a time series, a transfer function may be obtained that relates the inputs to the outputs and thereby provides a mathematical description of the process controlling the system. Though the Great Lakes may be described as being a nonlinear system due to the power law scaling exponent β and the stochastic and seemingly unpredictable nature of the data set, a linear systems approach of Control Theory may be used. However, in shifting perspective on the nature of stochastic time series behavior, a linear system approach is reasonable and provides all of the information needed to derive the frequency response of a system and to potentially discover the process or processes responsible for the generation of a time series. In the natural world, one may make the case that a natural stochastic time series, the effects of a scaling exponent on the behavior of that time series, and the meaning behind the scaling exponent β is more fully understood through the context of the mathematics of the convolution, which is the mathematical foundation upon which the linear systems approach of Control Theory is built.

In a linear systems approach, an input signal is transformed into an output signal by filtering the input through an impulse response filter. The output represents how the impulse response filter (the system) will scale (in magnitude) and shift (in phase) any input into the system at every frequency. This scaling and shifting of the input to output represents a convolution of the input signal with the system in the time domain. In the frequency domain, the impulse response filter may be represented as a transfer function and may also be referred to as the Frequency Response Model. In natural systems, usually only the measured output of the system is known, such as a time series of water levels, while the transfer function of the system is unknown and considered a black box. For large natural systems, the inputs into the system may be assumed to be a white noise or a stochastic Gaussian process, based on the Central Limit Theorem (CLT), combined with any periodicities that originate outside the system allowing for the transfer function or impulse response of the system to be derived directly from the scaling behavior of the power spectrum of the output signal.

The transfer function of the system, derived from the scaling exponent(s) β of the power spectrum at each frequency or frequency range, fully describes all scaling and shifting behavior at each frequency for any input that enters the system. The scaling exponent β of the transfer function is more than just a scaling factor which describes scaling of the input signal as attenuation or amplification of a magnitude at each frequency. The scaling exponent β also describes shifting of the input signal in phase in the frequency domain which translates to a time delay in the time domain, where the extent of the time delay is dependent upon both the scaling exponent β and frequency. The power spectrum of a stochastic time series may exhibit one value of the scaling exponent β for all frequencies or multiple values of the scaling exponent β over distinct ranges of frequencies, all of which may be encapsulated in a transfer function. Thus, the scaling exponent β of the power spectrum of any stochastic time series is not just a measure of noise in data, but actually a measure of the frequency response of the system that generated the time series from which transfer functions may be developed.

With the impulse response of the system, one can calculate the output signal for any possible input signal. In one sense, everything is known about the mathematical properties of the system through the Frequency Response Model which represents the complex internal dynamics of the natural system. The physical processes of the natural system filters the inputs into that system by scaling and shifting each frequency in the frequency domain to yield all of the changes seen in the measured output time series in the time domain. In the natural world, many physical interactions that take place are in terms of frequency, magnitude, and phase, not time. The question then becomes, how exactly the scaling exponent is incorporated into the mathematics of the convolution.

The output of a system is equal to the input convolved with the entire impulse response of the system, for an input series x[n] and a system impulse response h[n], an output signal y[n]=x[n]*h[n] where the * denotes convolution. Convolution in the time domain is equivalent to multiplication in the frequency domain. In the frequency domain, in rectangular notation, the relation between input, system, and output is X[k]·H[k]=Y[k], where the · denotes multiplication, and X[k], H[k], and Y[k] are the rectangular representations in the frequency domain of x[n], h[n], and y[n], respectively. In polar notation, separating magnitude and phase, the magnitudes are multiplied ($M_X[\omega] \cdot M_H[\omega] = M_Y[\omega]$), and the phases are added ($\theta_X[\omega] + \theta_H[\omega] = \theta_Y[\omega]$). The real (x) and imaginary (y) components of a complex number in rectangular notation are related to the polar notation via x=M cos (θ) and y=M sin (θ). Similarly to convolution in the time domain being equivalent to multiplication, deconvolution is equivalent to division (for polar notation, magnitudes are divided, and phases are subtracted).

Convolution in the time domain manifests as scaling behavior in the frequency domain in magnitude and power of polar notation. Though, the power-frequency scaling behavior that exists in a time series is not always obvious and the transfer functions for how a system processes inputs to generate that time series as output cannot be derived directly in the time domain, the scaling behavior in the frequency domain directly describes the process of convolution that occurs in the time domain. The convolution in the time domain is summarized in the transfer functions of the frequency domain as these functions describe how the system scales, in magnitude or power, and shifts, in phase, each frequency that enters into the system to generate the measured time series output. By converting from the time domain to the frequency domain using the FFT, development of transfer functions quantifying the underlying processes responsible for time series generation becomes possible allowing for a more thorough understanding of the time domain. The FFT is a linear equation, possessing the traits of homogeneity and additivity, which permit the observations of the signal in the frequency domain, such as scaling behavior, to be transformed back to the time domain with a similar meaning and implications. Shifts in the time domain are equivalent to phase shifts in the frequency domain (e.g., x[n+m] is equivalent to $M_X[\omega]$ and $\theta_X[\omega]+2\pi m f$, where f is the frequency, etc.), thus any shift in the time domain affects high frequencies more than low frequencies due to the way in which the phase handles each frequency.

Complex conjugation changes the sign of the phase in the frequency domain and is equivalent to reversing the order of the time series in the time domain, and will leave the magnitude unchanged, but reverse the sign of the phase. A time series is x[n] in the time domain and X[k] in the frequency domain, whereas the time reversed series is x[−n] and X*[k] (where * denotes the complex conjugate and is distinct from the convolution *). Complex conjugation has useful applications, including correlation, and cross-correlation in the time domain is denoted as x[n]*h[−n]=c[n] (while convolution is x[n]*h[n]=y[n], as discussed above), while the frequency domain equivalent is X[k]·H*[k]=C[k].

Conventional analysis focuses on the power spectrum, or magnitude squared, and discards all information associated with the phase (e.g., when events occur, whether the time series is running forwards or backwards, etc.). Phase information is needed to properly reconstruct the time series, and thus a signal cannot be properly reconstructed using conventional techniques when phase information is omitted. Phase preserves the overall structure of the time series, the proper shifting of input relative to output, and the order or direction of the time series, and is thus necessary for a complete analysis.

Conventional Control Theory addresses the concept of power spectra using $$\frac{1}{f^\beta}$$

to describe power scaling behavior, which refers only to scaling observed in real, positive frequencies in relation to the power at each frequency, and is a source of inaccuracies in conventional methods. Such methods contain no phase information and are limited, ignoring phase shifting that occurs at each frequency relative to the scaling exponent. Mathematically, the frequencies as a result of the FFT are positive and negative complex frequencies, with magnitude and phase. The scaling exponent β included on the complex frequency term jω defines both the scaling properties associated with each value of β and the amount of phase shifting. All of this phase shifting is ignored in conventional methods used to describe scaling behavior that focus on real instead of complex frequencies. The scaling exponent β is more than just the result of the linear least squares fit of a power law to the power spectrum of the measured output time series of a system. From the perspective of a convolution, the scaling exponent β is intrinsic to the transfer function and is part of the Frequency Response Model of the system.

In the complex analysis of the subject innovation, the scaling exponent is a fundamental property of the system (or filter), which scales and shifts the times series from input to output, instead of just a linear least squares fit of a power law to the power spectrum of the output. The lack of phase information in conventional techniques is especially problematic as β increases, because the phase shift increases with increasing β. The lack of phase information and proper alignment of sine and cosine components can also cause problems with generation of synthetic time series via the $$\frac{1}{f}$$

(conventional) methods, focusing only on the scaling, instead of both the scaling and shifting of β.

Complex Fourier transforms, e.g., $F[k]=\int_0^\infty f(t)e^{-jwt}dt$, are a subset of a broader transform, the Laplace transform, that uses complex exponentials to represent the time series in the Laplace frequency domain (s-domain), a complex frequency domain. The Laplace transform ($\mathcal{L}$) of time domain f(t) is represented as $\mathcal{L}[f(t)]=F(s)=\int_0^\infty f(t)e^{-st}\,dt$, where the Laplace variable s represents a complex variable of the form s=σ+jω where σ is a damping factor, or decay constant, and jω is the complex angular frequency. With initial conditions with σ=0, s=jω, and the index of the complex frequency term k as a result of the FFT in the convolution may be replaced with the Laplace variable s to represent a complex angular frequency jω. From a Control Theory perspective, the FFT convolution can be rewritten using Laplace notation in the Laplace frequency domain as X[s]·H[s]=Y[s]. In many stochastic systems, the system is an unknown black box, the input is unknown, and the output is the only measurable aspect. Fortunately, from the behavior of the scaling exponent(s) β at each frequency of the output time series, the transfer function of the unknown system can be built in the form of Laplace transforms. The methods behind creating the transfer function from the scaling exponents of the output signal are described above. For now, the focus is on the scaling exponent β and how and where the scaling exponent is incorporated into the Laplace transform in the general case of a single scaling system with one scaling exponent.

The simplest scaling behavior found in a time series is single scaling in which there is one scaling exponent over all frequencies. One of the most familiar and simple scaling processes is a Brownian motion time series, for which the step increments in time are random white noise. To create a Brownian motion time series, with a scaling exponent of approximately β=2, a random white noise with a scaling exponent of β=0 is integrated. In discrete terms, the running sum of a white noise produces a Brownian motion. From the standpoint of a convolution in the time domain, a white noise input signal x[n] is convolved with integration system h[n] yielding a Brownian motion as the output signal y[n]. Note that the change in scaling exponent due to the process of a single integration exactly increases the power scaling exponent by 2, from β=0 to β=2. The Laplace transform of a single integrator is $$\int_0^t f(t)d\tau = \frac{1}{s}F(s),$$

and for a double integrator is $$\frac{1}{s^2}$$

F(s), where the Laplace transform F(s) in the Laplace domain equations represents the Laplace transform of the time domain function that is to be integrated.

From Control Theory, the transfer function represents the impulse response of the system to a delta function or unit impulse, thus the transfer function H[s] for a single integrator is $$\frac{1}{s},$$

and for a system that integrates n times is $$\frac{1}{s^n}.$$

The power scaling exponent β indicates the number of integrations (or differentiations, as the inverse operation), with an increase of +2 for each integration (or −2 for each differentiation). Since the Laplace transforms are written in terms of magnitude and not power, when used with the power scaling exponent β, the degree of the exponent must agree with the degree of the variable and be divided in half to become β/2. Thus Laplace transfer function may now be written in terms of the power scaling exponent β by assigning n=β/2 to yield the transfer function $$H[s] = \frac{1}{s^{\frac{\beta}{2}}},$$

which better represents the complex frequency, including both scaling in magnitude and shifting in phase. Additionally, this provides a technique for performing and representing fractional integrations or differentiations, via increases or decreases of the scaling exponent β by any positive or negative real number, even a non-integer decimal, respectively.

For a single scaling transfer function, in terms of the scaling exponent, the magnitude is $$M(\omega) = \left(\frac{1}{\omega}\right)^{\frac{\beta}{2}}$$

and the power is $$P(\omega) = \left(\frac{1}{\omega}\right)^{\beta},$$

the phase shift for positive frequencies is $$\theta_{H(+\omega)} = -\beta\frac{\pi}{4},$$

and the phase shift for negative frequencies is $$\theta_{H(-\omega)} = \beta\frac{\pi}{4}$$

(to maintain odd symmetry of the sine component), and 0 at the Nyquist frequency (m=N/2, where N is the number of index values (m), indexed from 0 to N−1).

The relation between index values, frequencies, and angular frequencies is shown in FIG. 14. Once the appropriate frequencies are determined for each index value, the transfer function formula $$\frac{1}{s^{\frac{\beta}{2}}}$$

can be solved for magnitude and phase as indicated above. The rectangular notation values can be calculated from the polar values (magnitude and phase), with $$x_{Real} = M \cdot \cos\left(-\beta\frac{\pi}{4}\right)$$

and $$y_{Imaginary} = M \cdot \sin\left(-\beta\frac{\pi}{4}\right)$$

for positive frequencies. Substituting values for the magnitude, the rectangular notation of the transfer function is $$H_{[m]} = x_{[m]} + jy_{[m]} = \left(\left(\frac{1}{\omega}\right)^{\frac{\beta}{2}}\cos(\theta)\right)_{[m]} + \left(\left(\frac{1}{\omega}\right)^{\frac{\beta}{2}}\sin(\theta)\right)_{[m]},$$

where' θ is as indicated above for positive frequencies, negative frequencies, and the Nyquist frequency.

To obtain the output time series, the rectangular notation of the input series in the complex frequency domain can be multiplied by the rectangular notation of the transfer function in the complex frequency domain to obtain the rectangular notation of the output series in the complex frequency domain, which can then be passed through an IFFT to obtain the output series in the time domain. Because the symmetry and phase are preserved in techniques of the subject innovation, the result of the IFFT should have no imaginary numbers (or near zero, due to rounding error) to exclude as in conventional methods.

In general, the input, transfer function, and output each contain distinct values of the scaling exponent β at each frequency, both in magnitude and phase. The scaling behavior of the input, together with that of the system processing the input, will generate an output time series with the combined scaling behavior of both input and system. At each frequency, the local yet variable scaling exponent of the input adds to the fixed scaling exponent of the system at that same frequency to yield a new local, variable scaling exponent at that frequency of the output, collectively manifesting as the observed global scaling exponent over all frequencies of the output time series. The additive behavior of the scaling exponent β at each local frequency and over all global frequencies from input to output through the system may be summarized as $\beta_X + \beta_H = \beta_Y$, where $\beta_Y$, as the scaling behavior of the output time series, is what is generally measured as β when fitting a power spectrum with a power law to determine the slope. However, there are many ways to arrive at a given $\beta_Y$ based on combinations of different inputs and systems; the scaling behavior of the output ($\beta_Y$) only equals that of the system ($\beta_H$) when the input is white noise with $\beta_X=0$, which may not always be the case.

Regarding the phase of the input and output series, while both are essentially random, the relation between the two is not, and the output phase is the input phase shifted by the phase of the system at each frequency as defined by the transfer function $$\left(-\beta\frac{\pi}{4}\right)$$

for positive frequencies, 0 at the Nyquist frequency, and $$\beta\frac{\pi}{4}$$

for negative frequencies). From the phase at each frequency, a local exponent equivalent to β can be solved for the output signal and input signal, denoted herein as $\beta_\theta$, which is equal to $$\beta_{\theta(+\omega)} = \frac{-4\tan^{-1}\left(\frac{y}{x}\right)}{\pi}$$

for positive frequencies and $$\beta_{\theta(-\omega)} = \frac{4\tan^{-1}\left(\frac{y}{x}\right)}{\pi}$$

for negative frequencies. Since the local scaling exponent $\beta_\theta$ may be used as a proxy for phase when known for a frequency, $\beta_\theta$ can be used to solve for the imaginary component y in rectangular notation (x+jy) as y=x·tan $$\left(-\beta\frac{\pi}{4}\right)$$

and the real component x as $$x = \frac{y}{\tan\left(-\beta\frac{\pi}{4}\right)}.$$

The local scaling exponent solved for magnitude is denoted as $\beta_M$, and can be solved from $$\left(\frac{1}{\omega}\right)^{\frac{\beta}{2}} = \sqrt{x^2+y^2} \text{ as}$$

$$\beta_M = \frac{\log\left(\sqrt{x^2+y^2}\right)}{\log\left(\frac{1}{\sqrt{\omega}}\right)} = \log_{\left(\frac{1}{\sqrt{\omega}}\right)}\left(\sqrt{x^2+y^2}\right) = \log_{\left(\frac{1}{\sqrt{2\pi f}}\right)}\left(\sqrt{x^2+y^2}\right),$$

where the magnitude $M=\sqrt{x^2+y^2}$. The exponent $\beta_M$ at each frequency, while not random, also does not exhibit direct power law scaling, but will exhibit a clear pattern in the signal, with a discontinuity at $$f_A = \pm\frac{1}{2\pi} \approx \pm 0.159155.$$

This frequency is the magnitude transition frequency around which a transfer function of the system either amplifies or attenuates frequencies of the inputs into the system above or below this frequency based on the scaling exponent of the system. As with $\beta_\Theta$, $\beta_M$ can also be used to determine the global scaling exponent of the system, $\beta_H$, as the difference between input and output will reveal the scaling exponent of the system: $\beta_H=\beta_{M(Y)}-\beta_{M(X)}$. For multiscaling time series, each scaling region may be thought of as containing a regional scaling exponent (as $\beta_H$) over a distinct range of frequencies, which changes with frequency over the transition from one scaling region to the next. However, each regional scaling exponent of a multiscaling time series is a result of the interaction of several transfer functions spanning all frequencies so that when $\beta_H$ is found, the value represents the collective behavior of processes represented by the multiple transfer functions and not any one individual process. Notably, the exponent $\beta_M \neq \beta_\Theta$ at each frequency of the same time series, since the local scaling exponents are either dependent upon magnitude ($\beta_M$) or phase ($\beta_\Theta$), which have different values. However, either may be used to obtain the scaling exponent $\beta_H$ of the entire system.

The frequency $f_A$ is significant because for all values of the scaling exponent of the system of $\beta \geq 0$, the magnitudes of each frequency from input to output will be amplified for all (positive) frequencies lower than this magnitude transition frequency. At all (positive) frequencies higher than $f_A$ up to the Nyquist frequency, all magnitudes of each frequency from input to output will be attenuated by the system when $\beta \geq 0$. At $f_A$, the system magnitude is 1 and the magnitude is passed from input to output unchanged. The pattern is reversed when the system yields a scaling exponent of $\beta<0$. For multiscaling systems, the value of the scaling exponent of the system at which $f_A$ occurs will determine the attenuation/amplification behavior around this frequency. Phase is not affected at $f_A$. Additionally, $\beta_M$ has a discontinuity at $f_A$, yet $\beta_{M(H)}$ calculated from $\beta_{M(Y)}-\beta_{M(X)}$ at $\pm f_A$ is exactly the expected value of the global scaling exponent $\beta_H$ of the single scaling system or scaling region of a multiscaling system.

Typically, a power law fit to a distribution is said to have to span at least three orders of magnitude in order to be valid. While this may be true for power laws in size versus frequency plots or spatial systems where the order of data does not matter, the orders of magnitude rule does not apply in the same way to determine the scaling exponent of the stochastic time series in the frequency domain. The underlying equations indicate that when calculating a power scaling exponent, that power scaling is taking place across all frequencies and the scaling exponent $\beta$ exists in some form on all frequencies when in polar notation as an exponent on either magnitude or power. A time series is not the function or process but any time series is a sequence of numbers generated as the output or result of some mathematical function or process such as the integration of Gaussian white noise to become a Brownian motion or using a sine function to create a sine wave. However, as explained above, there may be other explanations for how the Brownian motion or even the sine wave that is observed as a time series was created. The scaling exponent of a system defines the process of the system and indirectly the output. The scaling exponent and transfer function relate not just to complex, stochastic time series, but to simple ones as well. In a simple time series output, such as a sine wave, a scaling exponent is not directly observed and one would not expect to measure a scaling exponent in a sine wave. However, if that sine wave is the output of a scaling process of a system, such as integration, then the effects of the scaling exponent in how that sine wave time series was created are defined within and intrinsic to the sine wave output at that specific frequency. For example, if a sine wave is an observed output, and the input was known to be a sine wave as well, with a −90° phase shift relative to the output, the scaling exponent $\beta$ can be measured from the frequency and the value of the offset, and it can be determined that the input is a cosine wave, and the transfer function is a single integrator. Thus, even though a scaling exponent cannot be directly measured in the output, the scaling exponent still exists in the transfer function of the system as an integrator. However, for stochastic data sets, the scaling processes that create the time series are embedded and can be directly measured in the output. Any stochastic time series that is measured as output may be thought of as a scaled and shifted version of an unknown input after undergoing convolution with the transfer function with a scaling exponent $\beta$ that represents how a system scales and shifts every frequency that enters that system. Thus, the scaling exponent $\beta$ is not a direct property of a time series, but a property of the underlying mathematics in the complex frequency domain.

Because the time and complex frequency domain representations of a stochastic time series represent the same series, certain properties are the same, such as the energy, per Parseval's Energy Theorem, $$\sum_{n=0}^{N-1} |x(n)|^2 = \frac{1}{N}\sum_{k=0}^{N-1} |X(k)|^2,$$

which states that the total energy in the time series as the sum of the power of each value x(n) is equal to the sum of the power of each frequency component. For single scaling time series in which one value of the scaling exponent $\beta$ defines the scaling behavior of the power spectrum over all frequencies, the contribution of the energy of each frequency scales as well according to $\beta$. With Gaussian white noise input, for both differentiation ($\beta<0$) and integration ($\beta>0$), there is an increase in energy observed in the output time series after passing through a $$\frac{1}{s^{\frac{\beta}{2}}}$$

system. Differentiation amplifies high frequencies and attenuates low frequencies around $f_A$, with the reverse for integration which amplifies low frequencies and attenuates high frequencies with an increase in energy increasing with increasing $\beta$. However, the amplification of high frequencies within a signal from differentiation with $\beta=-2$ adds less energy to the output signal than the amplification of low frequencies from integration with $\beta=2$, even though the only difference is the sign of the scaling exponent in the $$\frac{1}{s^{\frac{\beta}{2}}}$$

system.

From Parseval's theorem, the total energy within a time series is equal to the sum of the energy, or power, at each frequency. For a system with transfer function $$\frac{1}{s^{\frac{\beta}{2}}},$$

the magnitude is $$\frac{1}{\omega^{\frac{\beta}{2}}}$$

at each frequency, for power $$\frac{1}{\omega^{\beta}}$$

at each frequency, which can be summed to yield the total energy contained within the transfer function, over the range of frequencies dictated by the length of the time series, for any value of the scaling exponent $\beta$. Because magnitude and power will always be positive, this sum will always be a positive total energy value of the transfer function for any system with a single scaling exponent $\beta$, regardless of whether $\beta$ is positive (integration) or negative (differentiation). For $\beta=0$, there will be no change from input to output, and no change in energy. However, when applied to an input with a scaling exponent of $\beta \neq 0$, the transfer function will not always increase the energy, since the energies within any signal are amplified or attenuated based on frequency (e.g., differentiation with $\beta=-2$ of a Brownian motion time series ($\beta=2$) that contains significant power in the low frequencies will result in Gaussian white noise ($\beta=0$), which is a lower energy signal.

From the energy of the transfer function, the total change in energy from input to output is the energy of the input signal multiplied by that of the transfer function, $E_X \cdot E_H = E_Y$. For Gaussian white noise input, the energy of the input is approximately the length of the time series, $E_X \approx N$, thus $N \cdot E_H \approx E_Y$, and the approximate energy of a single scaling, integral transfer function $$\frac{1}{s^{\frac{\beta}{2}}},$$

with any value of $\beta>1$, $E_H \approx 10^{a\beta+b}$, where a and b are parameters which incorporate the length of the time series when $\beta>1$, with $a=0.8203N^{0.1442}$ and $b=-(0.9271N^{0.1364})$, where N is the length of the time series. For differentiation with $\beta<-0.5$, the equation is $E_H \approx 10^{(-0.297\beta-0.088)}$ since the energy of the single scaling, differential transfer function is not dependent on the length of the time series.

For a multiscaling time series, there are distinct frequency regions (R) defined by the scaling exponent $\beta$ over which a certain scaling behavior holds. In the frequency domain, the sum of the energy at each individual frequency yields the total energy of the signal. With a slight modification to the above equation for total energy, the sum of energies, $E_R$, of each scaling frequency region R, defined by one value of the scaling exponent $\beta$ over a limited range of frequencies, will also yield the total energy, $E_T$, of the signal. Thus, if the frequencies are separated by scaling behavior so that all frequencies with the same scaling exponent $\beta$ represent the same physical process(es), then the contribution of energy of each distinct scaling frequency region to the total energy of the signal may be calculated. As such, the contribution of specific physical processes to the total energy may be calculated when the energies are separated within the energy calculation by the range of frequencies over which a certain scaling behavior holds. The total energy is equal to the sum of the energy at the zero frequency with that of each of the scaling regimes, e.g., for an example sequence with two scaling regimes $R_1$ and $R_2$ changing at example index values, $$E_T = \frac{1}{N}\sum_{k=0}^{N-1}|X(k)|^2 = E_0 + E_{R1} + E_{R2} = \left(\frac{|X(k_0)|^2}{N}\right) +$$

$$\left(\left(\frac{1}{N}\sum_{k=1}^{\frac{N}{4}}|X(k)|^2\right) + \left(\frac{1}{N}\sum_{k=\frac{3N}{4}}^{N-1}|X(k)|^2\right)\right) + \left(\frac{1}{N}\sum_{k=\frac{N}{4}+1}^{\frac{3N}{4}-1}|X(k)|^2\right).$$

The percent energy contribution of each energy region, excluding the energy at zero frequency (which can significantly bias results), is $$PE_{R(n)} = \frac{E_{R(n)}}{(E_T - E_0)} \cdot 100.$$

Figure 15:
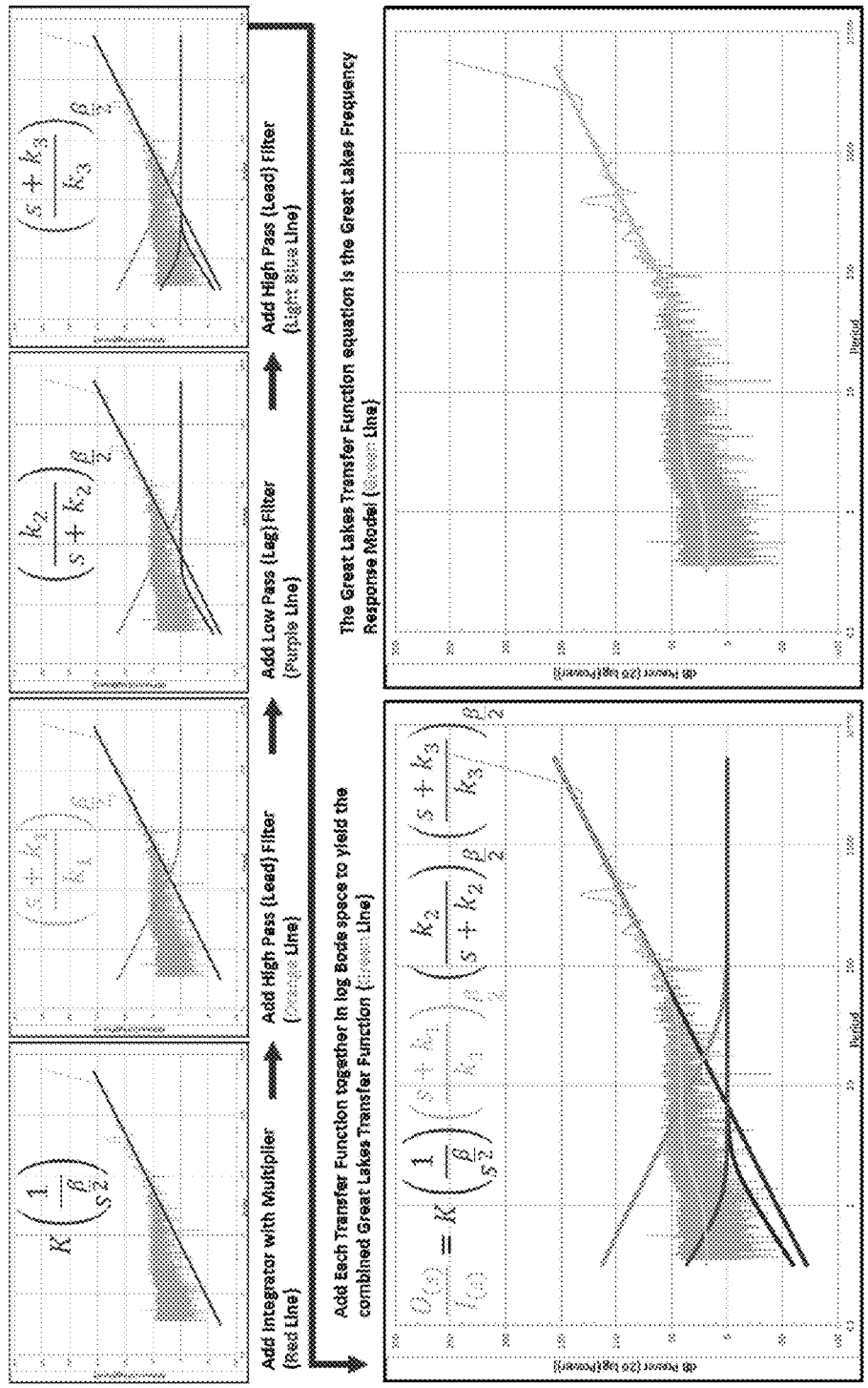
FIG. 15 illustrates a summary of the method for fitting transfer functions to a Bode Plot of Great Lakes water level data.

FIG. 15 illustrates a summary of the method for fitting transfer functions to a Bode Plot of Great Lakes water levels. The Laplace transfer functions are fit to each section with a distinct scaling exponent $\beta$. Each transfer function represents one component frequency response of the entire Great Lakes transfer function and serves to explain each distinct scaling region of the Bode plot though all transfer functions span all frequencies. The overall fit is one transfer function representing the Great Lakes Frequency Response Model over all frequencies. The representation of the power spectrum, normally in log-log space, in Bode space, as a semi-log plot with decibels as 20 log(Power) on the y-axis allows the transfer functions to be graphically added to more easily select the correct transfer function to use. All fits begin from the low frequencies toward the high frequencies (in these plots, with period on the x-axis, that is from right to left).

Figure 16:
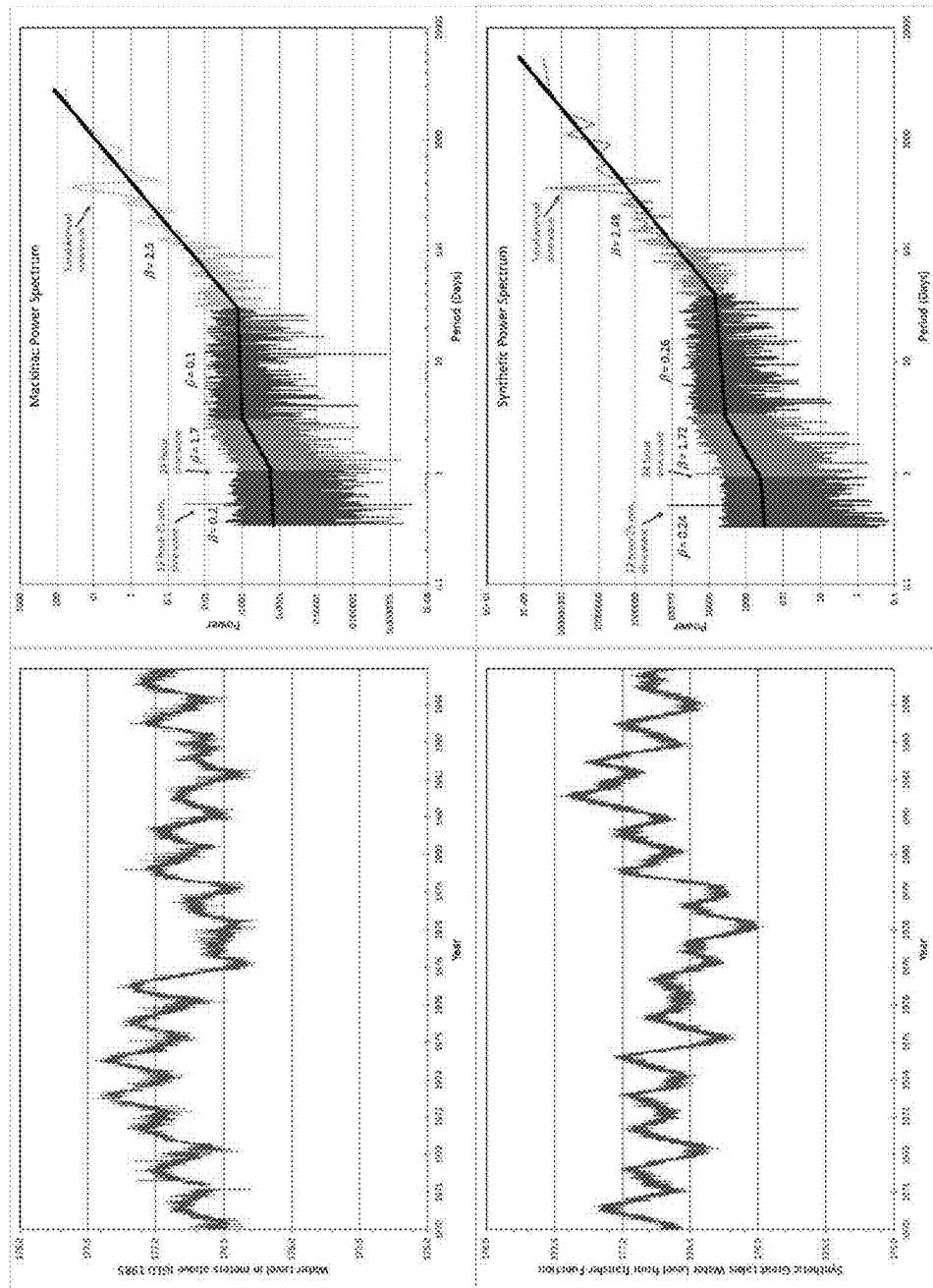
FIG. 16 illustrates a comparison of time series and power spectrum of real (top) and synthetic (bottom) data.

FIG. 16 illustrates a comparison of time series and power spectrum of real (top) and synthetic (bottom) data. The Great Lakes Frequency Response Model captures the scaling behavior of the original time series by mathematically defining the processes of the system that created the time series. For all practical purposes, the synthetic data set cannot be distinguished visually or mathematically from the real data. Additional synthetic data sets were constructed using systems and methods discussed herein, each with different Gaussian white noise input, each of which were similarly indistinguishable from one another and the real data.

Fractional Scaling Digital Filters

In various aspects, the subject innovation can include fractional scaling digital filters, and methods of fractional scaling digital filtering, which can incorporate a scaling exponent. Fractional Scaling Digital Filters and filtering of the subject innovation can be used to: (a) produce pure noise signals, (b) simulate any natural or stochastic signal (e.g., even music, etc.), (c) fractionally filter any simple or complex signal more effectively than conventional filters, or (d) serve as the equations in fractional order control systems which are more robust and perform better than integer order control systems.

In various embodiments, the subject innovation can comprise systems, methods, and articles that can facilitate digital filtering of signals via fractional scaling exponents. Current technologies employ digital signal processing (DSP) algorithms which utilize mathematical filters based on integer-order calculus to filter signals of natural and stochastic complex systems. However, while these traditional DSP filters generally exhibit a high level of performance, conventional digital filter designs are often limited in ability to accurately perform frequency modifications on a signal to both filter and reconstruct natural and stochastic complex system signals. In many instances, the filtered signal contains mathematical artifacts of the filtering process (e.g., ripples, wide transition band with slow roll-off) as approximations of the ideal signal which may obscure or alter the relevant signal within the filtered data set resulting in a loss of information from the signal. However, methods and algorithms discussed herein can address the mathematical artifacts introduced by traditional DSP filters and can refine conventional digital filter designs in order to generate robust mathematical digital filters that are highly accurate, precise, and efficient. Existing limitations in the design of digital filters can be addressed via Fractional Scaling Digital Filters or sNoise Filters as discussed herein, which greatly improve upon the performance, accuracy, and precision of DSP filters, methods, and algorithms.

Fractional Scaling Digital Filters allow fractional calculus, and thus fractional filtering (e.g., fractional scaling, fractional phase shifting, fractional integration, or fractional differentiation), to be performed on a signal, represent exact filtering solutions rather than approximations, and demonstrably are extremely accurate, highly efficient, and exhibit a higher level of performance than traditional DSP filters. In accordance with aspects of the subject innovation, the mathematics of digital filters used to represent complex systems or filter complex signals need not be confined to integer-only control orders of the Laplace transfer function equations of traditional DSP filters; fractional filtering occurs and within natural and stochastic complex systems and signals, fractional order control represented by Fractional Scaling Digital Filters of the subject innovation is the norm. In other words, signals from many real world dynamic systems, recorded as discrete stochastic data, may be better defined and filtered using fractional order dynamic system models (as Fractional Order Control Systems and Fractional Scaling Digital Filters) based on fractional calculus.

The mathematics of Fractional Scaling Digital Filters, while proving useful for analysis and modeling of natural and stochastic signals and systems, enhances the base Laplace transfer function equations of traditional DSP filters, allowing fractional control orders, in the form of the fractional scaling exponent $\beta$, to be used in place of integer-only control orders of these traditional mathematical filters. As shown herein, the fractional power scaling exponent $\beta$ can be introduced directly into Laplace transforms, thus the traditional transfer functions found in Laplace transform tables which use integer-based exponents to define filters that only perform integer-order calculus operations can be rewritten to include fractional scaling exponents allowing Fractional Scaling Digital Filters to be designed which can perform fractional order calculus with extreme accuracy.

Through modifications of the traditional Laplace transfer functions discussed herein, the fractional power scaling exponent $\beta$ was incorporated into six basic building block Laplace transfer functions (FIGS. 7 and 8), each solved for magnitude and phase, from which, based on the sign of the scaling exponent, there are eleven fundamental forms (FIG. 9-13) that comprise a catalog of Fractional Scaling Digital Filters. These six basic building block transfer functions, either alone or grouped together in any combination, can be used to design digital filters with exact frequency modifications or to describe the complex physical or mathematical process(es) of a variety of systems responsible for generation of single or multiscaling behavior observed within natural or stochastic complex system signals. The catalog of six basic building block transfer functions serve as a Fractional Scaling Digital Filter "bank" from which a multitude of more sophisticated filters can be developed, such as a Low Pass Fractional Scaling Digital Filter, High Pass Fractional Scaling Digital Filter, Band Pass Fractional Scaling Digital Filter, Notch Fractional Scaling Digital Filter, Resonance Fractional Scaling Digital Filter, Harmonic Resonance Fractional Scaling Digital Filter, or any other complex Fractional Scaling Digital Filter or Frequency Response Model.

By utilizing a fractional order control systems approach to digital signal processing, Fractional Scaling Digital Filters provide the ability to selectively filter complex data sets and can achieve nearly any desired filtering characteristic with a high degree of accuracy from sharp transitions within a narrow bandwidth to complicated structures within the passband, all without introducing the mathematical artifacts of current state-of-the-art filters or resulting in a loss of information in the filtered signal. Information contained within natural and stochastic complex systems and signals may be modeled more accurately using Fractional Scaling Digital Filters within Frequency Response Models (FRM) allowing for the development of quantitative, equation-based models of the dynamics of these natural and stochastic complex systems which then can be used to generate entirely synthetic signals that are statistically identical to the signals that would normally emerge from these systems. Furthermore, Fractional Scaling Digital Filters allow for a variety of selective filtering capabilities and may also perform magnitude-only frequency modifications (without phase distortion or with only a linear phase) or phase-only frequency modifications on any signal by using the equivalent portion of the filter providing flexibility in the filter design.

With this new class of transfer functions, one may design digital filters from Fractional Scaling Digital Filters with fractional control orders to allow precise modification of the fractional scaling and/or phase shifting of the frequency content of any signal. Fractional Scaling Digital Filters can also act as "smart" digital signal processing filters that self-adjust in near-real time to the measured input signal actively adapting to fluctuations or noise within the signal to yield the desired filtered response. When comparing the performance of traditional DSP filters versus the performance of a Fractional Scaling Digital Filter, fewer equations and parameters are necessary to achieve fractional rates of attenuation of specific frequency regions translating into a reduction in the amount of time necessary for calculations. In essence, a Fractional Scaling Digital Filter provides the capability to fractionally filter any signal leading to a more effective and finely tuned filter than is possible with conventional filter designs which do not utilize fractional calculus.

By employing algorithms containing the mathematics of Fractional Scaling Digital Filters, fractional control order digital filters in accordance with the subject innovation can be employed in a range of industries. An example software implementation of the mathematical algorithms of Fractional Scaling Digital Filters can include a blockset as an embedded systems testing environment. Example hardware implementations include encoding the Fractional Scaling Digital Filters into a field-programmable gate array (FPGA) device or within a DSP chipset which can then be used to perform fractional filtering on digital signals, build digital "smart" adaptive fractional filters, or enhance the sensitivity of sensors within the commercial, scientific, defense, etc., industries. Fractional Scaling Digital Filters also provide a method to quantitatively describe the harmonic spectrum of a scale of notes of a variety of musical instruments and allow for the development of a Frequency Response Model for each note of a musical instrument which may be used to generate purely mathematical but realistic musical sounds for use in digital synthesizers and software. In digital circuits, filters, and systems, Fractional Scaling Digital Filters can reduce computation time, increase efficiency allowing for faster circuits or response through the system, and improve the accuracy of circuits and filters eliminating approximation errors.

As another added benefit, some aspects of current control systems may be better defined by more accurate and efficient Fractional Order Control Systems through the substitution of the equations of Fractional Scaling Digital Filters for the traditional DSP filter equations. As the equations that also define control and movement, control algorithms that use the fractional mathematics of Fractional Scaling Digital Filters to model the dynamic behavior of systems can also improve the response, stability, and machine learning capability of robotic platforms such as bionics, wearable exoskeletons, and unmanned vehicles. Thus, the fractional mathematics of Fractional Scaling Digital Filters ultimately may provide greater command and control of filtered signals leading to the ability to more accurately define movement and control algorithms. Fractional Order Control Systems, such as a fractional order proportional-integral-derivative (PID) controller, provide greater stability and performance under strong perturbations since fractional control systems are more flexible, better able to adapt to dynamic properties of an environment, and also have more effective damping characteristics. Any device, robot, platform, or vehicle controlled by fractional control systems which utilize Fractional Scaling Digital Filters can recover faster and with greater accuracy from disturbances allowing for smoother and more efficient control than the same controlled by conventional control systems which use traditional DSP filters.

Overall, the development of Fractional Scaling Digital Filters offers the potential to revolutionize the way in which digital signals and systems are currently seen, modeled, filtered, and controlled, and represent a remarkable technological advancement over conventional digital filter designs. The usefulness of Fractional Scaling Digital Filters and their use in fractional order control systems extends across a multitude of disciplines from control theory, cybernetics, information theory, medicine, neuroscience, neuroengineering, cognitive science, and the human behavioral sciences to aerospace, control systems, robotics, mechanical engineering, mechatronics, sensors, electrical engineering, telecommunications, audio, video, and digital signal processing, and applications such as RADAR and SONAR. Thus, the increased accuracy and precision of Fractional Scaling Digital Filters combined with a fractional order control systems approach may rapidly accelerate technological developments in a variety of fields to generate robust solutions for the future.

Low Pass Fractional Scaling Digital Filter

In various embodiments, the subject innovation can comprise a low pass fractional scaling digital filter. The Low Pass Fractional Scaling Digital Filter can pass all frequencies within the low frequency passband and can attenuate all frequencies within the high frequency stopband. In the most basic form, the Low Pass Fractional Scaling Digital Filter leaves the scaling behavior of both low and high frequency regions intact. As with each advanced filter, the design of the Low Pass Fractional Scaling Digital Filter can begin at the low frequencies and the filter is built towards the high frequencies. The Low Pass Fractional Scaling Digital Filter can be constructed from two of the six basic building block transfer functions (FIGS. 7 and 8). Two building block equations can be used, one for the passband and one for the stopband, since each equation spans all frequencies and the interaction of these two equations is what can produce the Low Pass Fractional Scaling Digital Filter. To describe the low frequency passband, the fourth basic building block transfer function (Low Pass (Lag) Filter or $$\left(\frac{k_1}{s+k_1}\right)_{\frac{\beta}{2}},$$

seen in FIG. 8) is utilized which will pass all frequencies lower than the gain value $k_1$. To describe the high frequency stopband, the second basic building block transfer function (High Frequency Amplifier (Lead Filter) or $$\left(\frac{s+k_2}{k_2}\right)_{\frac{\beta}{2}},$$

seen in FIG. 7) is utilized which will counteract the scaling effect of the Low Pass (Lag) Filter of the passband and cause the stopband to flatten with the overall effect of attenuating all frequencies higher than the gain value $k_2$. The bulk of the transition band occurs between $k_1$ and $k_2$ and within the Low Pass Fractional Scaling Digital Filter, $k_1$ is the gain value in the Low Pass (Lag) Filter or $$\left(\frac{k_1}{s+k_1}\right)_{\frac{\beta}{2}}$$

and $k_2$ the gain value in the High Frequency Amplifier (Lead Filter) or $$\left(\frac{s+k_2}{k_2}\right)_{\frac{\beta}{2}}.$$

The Low Pass Fractional Scaling Digital Filter with all parameters and the scaling exponent β included is:

$$\frac{O(s)}{I(s)} = K\left(\frac{k_1}{s+k_1}\right)_{\frac{\beta_1}{2}}\left(\frac{s+k_2}{k_2}\right)_{\frac{\beta_2}{2}}$$

with $k_1 \leq k_2$. Both the amount of attenuation of the stopband frequencies and the width of the transition band may be modified using different values for parameters K(optional), $\beta_1$, $\beta_2$, $k_1$ and $k_2$ for each of the two distinct building block equations that comprise the Low Pass Fractional Scaling Digital Filter in order to further customize the filter.

The Low Pass Fractional Scaling Digital Filter has the following parameters shown in Table 1:

TABLE 1

(Low Pass Fractional Scaling Digital Filter)

| Low Pass Fractional Scaling Digital Filter | K (Optional) | $\left(\frac{k_1}{s+k_1}\right)_{\frac{\beta_1}{2}}$ | $\left(\frac{s+k_2}{k_2}\right)_{\frac{\beta_2}{2}}$ |
|---|---|---|---|
| Magnitude $M_{FLP}$ | K (Optional) | $\sqrt{\frac{k_1^{\beta_1}}{\omega^{\beta_1}+k_1^{\beta_1}}}$ | $\sqrt{\frac{\omega^{\beta_2}+k_2^{\beta_2}}{k_2^{\beta_2}}}$ |
| Phase $\theta_{(+\omega)FLP}$ | ... | $-\tan^{-1}\left(\frac{\omega^{\frac{\beta_1}{2}}}{k_1^{\frac{\beta_1}{2}}}\right)$ | $\tan^{-1}\left(\frac{\omega^{\frac{\beta_2}{2}}}{k_2^{\frac{\beta_2}{2}}}\right)$ |
| K | ... | ... | ... |
| β | ... | $\beta_1 = 85$ | $\beta_2 = 85$ |
| k | ... | $k_1 = 0.045$ | $k_2 = 0.05$ |
| $+\omega_k$ | ... | $\omega_{k_1} = 0.2827$ | $\omega_{k_2} = 0.3142$ |

Low Pass Fractional Scaling Digital Filter with Scaling Correction

In another example, the subject innovation can include a Low Pass Fractional Scaling Digital Filter with low or high frequency scaling correction (SC), with a form of:

$$\frac{O(s)}{I(s)} = \left(\frac{K}{s^{\frac{\beta_1}{2}}}\right)\left(\frac{k_1}{s+k_1}\right)_{\frac{\beta_2}{2}}\left(\frac{s+k_2}{k_2}\right)_{\frac{\beta_2}{2}} \text{ with } k_1 \leq k_2.$$

Examples of Low Pass Fractional Scaling Digital Filters with low or high frequency Scaling Correction have the following parameters, which may be modified to further customize the filter, shown in Tables 2-11:

TABLE 2

(Low Pass Fractional Scaling Digital Filter (SC-A))

| Low Pass Fractional Scaling Digital Filter (SC-A) | $\left(\frac{K}{s^{\frac{\beta_1}{2}}}\right)$ | $\left(\frac{k_1}{s+k_1}\right)_{\frac{\beta_2}{2}}$ | $\left(\frac{s+k_2}{k_2}\right)_{\frac{\beta_3}{2}}$ |
|---|---|---|---|
| Magnitude $M_{LSC}$ | $\left(\frac{K}{\omega^{\frac{\beta_1}{2}}}\right)$ | $\sqrt{\frac{k_1^{\beta_2}}{\omega^{\beta_2}+k_1^{\beta_2}}}$ | $\sqrt{\frac{\omega^{\beta_3}+k_2^{\beta_3}}{k_2^{\beta_3}}}$ |
| Phase $\theta_{(+\omega)LSC}$ | $\left(-\frac{\beta_1\pi}{4}\right)$ | $-\tan^{-1}\left(\frac{\omega^{\frac{\beta_2}{2}}}{k_1^{\frac{\beta_2}{2}}}\right)$ | $\tan^{-1}\left(\frac{\omega^{\frac{\beta_3}{2}}}{k_2^{\frac{\beta_3}{2}}}\right)$ |
| K | K = 1 | ... | ... |
| β | $\beta_1 = 0$ | $\beta_2 = 85$ | $\beta_3 = 85$ |
| k | ... | $k_1 = 0.045$ | $k_2 = 0.05$ |
| $+\omega_k$ | ... | $\omega_{k_1} = 0.2827$ | $\omega_{k_2} = 0.3142$ |

TABLE 3

(Low Pass Fractional Scaling Digital Filter (SC-B))

| Low Pass Fractional Scaling Digital Filter (SC-B) | $\left(\frac{K}{s^{\frac{\beta_1}{2}}}\right)$ | $\left(\frac{k_1}{s+k_1}\right)_{\frac{\beta_2}{2}}$ | $\left(\frac{s+k_2}{k_2}\right)_{\frac{\beta_3}{2}}$ |
|---|---|---|---|
| Magnitude $M_{LSC}$ | $\left(\frac{K}{\omega^{\frac{\beta_1}{2}}}\right)$ | $\sqrt{\frac{k_1^{\beta_2}}{\omega^{\beta_2}+k_1^{\beta_2}}}$ | $\sqrt{\frac{\omega^{\beta_3}+k_2^{\beta_3}}{k_2^{\beta_3}}}$ |
| Phase $\theta_{(+\omega)LSC}$ | $\left(-\frac{\beta_1\pi}{4}\right)$ | $-\tan^{-1}\left(\frac{\omega^{\frac{\beta_2}{2}}}{k_1^{\frac{\beta_2}{2}}}\right)$ | $\tan^{-1}\left(\frac{\omega^{\frac{\beta_3}{2}}}{k_2^{\frac{\beta_3}{2}}}\right)$ |
| K | K = 1 | ... | ... |
| β | $\beta_1 = 0$ | $\beta_2 = 85$ | $\beta_3 = 85$ |
| k | ... | $k_1 = 0.045$ | $k_2 = 0.05$ |
| $+\omega_k$ | ... | $\omega_{k_1} = 0.2827$ | $\omega_{k_2} = 0.3142$ |

TABLE 4

(Low Pass Fractional Scaling Digital Filter (SC-C))

| Low Pass Fractional Scaling Digital Filter (SC-C) | $\left(\frac{K}{s^{\frac{\beta_1}{2}}}\right)$ | $\left(\frac{k_1}{s+k_1}\right)_{\frac{\beta_2}{2}}$ | $\left(\frac{s+k_2}{k_2}\right)_{\frac{\beta_3}{2}}$ |
|---|---|---|---|
| Magnitude $M_{LSC}$ | $\left(\frac{K}{\omega^{\frac{\beta_1}{2}}}\right)$ | $\sqrt{\frac{k_1^{\beta_2}}{\omega^{\beta_2}+k_1^{\beta_2}}}$ | $\sqrt{\frac{\omega^{\beta_3}+k_2^{\beta_3}}{k_2^{\beta_3}}}$ |
| Phase $\theta_{(+\omega)LSC}$ | $\left(-\frac{\beta_1\pi}{4}\right)$ | $-\tan^{-1}\left(\frac{\omega^{\frac{\beta_2}{2}}}{k_1^{\frac{\beta_2}{2}}}\right)$ | $\tan^{-1}\left(\frac{\omega^{\frac{\beta_3}{2}}}{k_2^{\frac{\beta_3}{2}}}\right)$ |
| K | K = 1 | ... | ... |
| β | $\beta_1 = 0$ | $\beta_2 = 85$ | $\beta_3 = 85$ |
| k | ... | $k_1 = 0.045$ | $k_2 = 0.05$ |
| $+\omega_k$ | ... | $\omega_{k_1} = 0.2827$ | $\omega_{k_2} = 0.3142$ |

TABLE 5

(Low Pass Fractional Scaling Digital Filter (SC-D))

| Low Pass Fractional Scaling Digital Filter (SC-D) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = 2$ | $\beta_2 = 85$ | $\beta_3 = 87$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 6

(Low Pass Fractional Scaling Digital Filter (SC-E))

| Low Pass Fractional Scaling Digital Filter (SC-E) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = 2$ | $\beta_2 = 85$ | $\beta_3 = 89$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 7

(Low Pass Fractional Scaling Digital Filter (SC-F))

| Low Pass Fractional Scaling Digital Filter (SC-F) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = 2$ | $\beta_2 = 85$ | $\beta_3 = 85$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 8

(Low Pass Fractional Scaling Digital Filter (SC-G))

| Low Pass Fractional Scaling Digital Filter (SC-G) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = -2$ | $\beta_2 = 85$ | $\beta_3 = 83$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 9

(Low Pass Fractional Scaling Digital Filter (SC-H))

| Low Pass Fractional Scaling Digital Filter (SC-H) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = -2$ | $\beta_2 = 85$ | $\beta_3 = 85$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 10

(Low Pass Fractional Scaling Digital Filter (SC-I))

| Low Pass Fractional Scaling Digital Filter (SC-I) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = -2$ | $\beta_2 = 85$ | $\beta_3 = 81$ |
| k | . . . | $k_1 = 0.045$ | $k_2 = 0.05$ |
| $+\omega_k$ | . . . | $\omega_{k_1} = 0.2827$ | $\omega_{k_2} = 0.3142$ |

TABLE 11

(Variant of Low Pass Fractional Scaling Digital Filter (SC-I-1))

| Low Pass Fractional Scaling Digital Filter (SC-I-1) | $\left(\dfrac{K}{s^{\frac{\beta_1}{2}}}\right)$ | $\left(\dfrac{k_1}{s+k_1}\right)_{\frac{\beta_2}{2}}$ | $\left(\dfrac{s+k_2}{k_2}\right)_{\frac{\beta_3}{2}}$ |
|---|---|---|---|
| Magnitude $M_{LSC}$ | $\left(\dfrac{K}{\omega^{\frac{\beta_1}{2}}}\right)$ | $\sqrt{\dfrac{k_1^{\beta_2}}{\omega^{\beta_2}+k_1^{\beta_2}}}$ | $\sqrt{\dfrac{\omega^{\beta_3}+k_2^{\beta_3}}{k_2^{\beta_3}}}$ |
| Phase $\theta_{(+\omega)LSC}$ | $\left(-\dfrac{\beta_1 \pi}{4}\right)$ | $-\tan^{-1}\left(\dfrac{\omega^{\frac{\beta_2}{2}}}{k_1^{\frac{\beta_2}{2}}}\right)$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = -2$ | $\beta_2 = 85$ | $\beta_3 = 81$ |
| k | ... | $k_1 = 0.045$ | $k_2 = 0.045$ |
| $+\omega_k$ | ... | $\omega_{k_1} = 0.2827$ | $\omega_{k_2} = 0.2827$ |

High Pass Fractional Scaling Digital Filter

In another example, the subject innovation can include a High Pass Fractional Scaling Digital Filter, with a form of:

$$\frac{O(s)}{I(s)} = K\left(\frac{s+k_1}{k_1}\right)_{\frac{\beta_1}{2}}\left(\frac{k_2}{s+k_2}\right)_{\frac{\beta_2}{2}}$$

with $k_1 \leq k_2$. As with the Low Pass Fractional Scaling Digital Filter (SC), the High Pass Fractional Scaling Digital Filter, and other Fractional Scaling Digital Filters presented herein, may be further modified to introduce low or high frequency scaling corrections through parameter changes or inclusion of additional building block equations.

An example of a High Pass Fractional Scaling Digital Filter has the following parameters shown in Table 12:

TABLE 12

(High Pass Fractional Scaling Digital Filter):

| High Pass Fractional Scaling Digital Filter | K | $\left(\dfrac{s+k_1}{k_1}\right)_{\frac{\beta}{2}}$ | $\left(\dfrac{k_2}{s+k_2}\right)_{\frac{\beta}{2}}$ |
|---|---|---|---|
| Magnitude $M_{FHP}$ | K | $\sqrt{\dfrac{\omega^\beta + k_1^\beta}{k_1^\beta}}$ | $\sqrt{\dfrac{k_2^\beta}{\omega^\beta + k_2^\beta}}$ |
| Phase $\theta_{(+\omega)FHP}$ | ... | $\tan^{-1}\left(\dfrac{\omega^{\frac{\beta}{2}}}{k_1^{\frac{\beta}{2}}}\right)$ | $-\tan^{-1}\left(\dfrac{\omega^{\frac{\beta}{2}}}{k_2^{\frac{\beta}{2}}}\right)$ |
| K | K = 0.0113585 | ... | ... |
| β | ... | β = 85 | β = 85 |
| k | ... | $k_1 = 0.045$ | $k_2 = 0.05$ |
| $+\omega_k$ | ... | $\omega_{k_1} = 0.2827$ | $\omega_{k_2} = 0.3142$ |

Band Pass Fractional Scaling Digital Filter

In another example, the subject innovation can include a Band Pass Fractional Scaling Digital Filter, with a form of:

$$\frac{O(s)}{I(s)} = K\left(\frac{s+k_1}{k_1}\right)_{\frac{\beta_1}{2}}\left(\frac{k_2}{s+k_2}\right)_{\frac{\beta_2}{2}}\left(\frac{k_3}{s+k_3}\right)_{\frac{\beta_3}{2}}\left(\frac{s+k_4}{k_4}\right)_{\frac{\beta_4}{2}}$$

with (to perform similarly to an ideal band pass filter) $k_1 < k_2 < k_3 < k_4$, although $k_1 \leq k_2 \leq k_3 \leq k_4$ may be employed with the result of a Complex Fractional Scaling Digital Filter when any are equal.

An example of a Band Pass Fractional Scaling Digital Filter has the following parameters shown in Table 13:

TABLE 13

(Band Pass Fractional Scaling Digital Filter):

| Band Pass Fractional Scaling Digital Filter | K | $\left(\dfrac{s+k_1}{k_1}\right)_{\frac{\beta}{2}}$ | $\left(\dfrac{k_2}{s+k_2}\right)_{\frac{\beta}{2}}$ | $\left(\dfrac{k_3}{s+k_3}\right)_{\frac{\beta}{2}}$ | $\left(\dfrac{s+k_4}{k_4}\right)_{\frac{\beta}{2}}$ |
|---|---|---|---|---|---|
| Magnitude $M_{FBP}$ | K | $\sqrt{\dfrac{\omega^\beta+k_1^\beta}{k_1^\beta}}$ | $\sqrt{\dfrac{k_2^\beta}{\omega^\beta+k_2^\beta}}$ | $\sqrt{\dfrac{k_3^\beta}{\omega^\beta+k_3^\beta}}$ | $\sqrt{\dfrac{\omega^\beta+k_4^\beta}{k_4^\beta}}$ |
| Phase $\theta_{(+\omega)FBP}$ | ... | $\tan^{-1}\left(\dfrac{\omega^{\frac{\beta}{2}}}{k_1^{\frac{\beta}{2}}}\right)$ | $-\tan^{-1}\left(\dfrac{\omega^{\frac{\beta}{2}}}{k_2^{\frac{\beta}{2}}}\right)$ | $-\tan^{-1}\left(\dfrac{\omega^{\frac{\beta}{2}}}{k_3^{\frac{\beta}{2}}}\right)$ | $\tan^{-1}\left(\dfrac{\omega^{\frac{\beta}{2}}}{k_4^{\frac{\beta}{2}}}\right)$ |
| K | K = 0.0034305 | ... | ... | ... | ... |
| β | ... | β = 85 | β = 85 | β = 85 | β = 85 |
| k | ... | $k_1 = 0.035$ | $k_2 = 0.04$ | $k_3 = 0.055$ | $k_4 = 0.062825$ |
| $+\omega_k$ | ... | $\omega_{k_1} = 0.2199$ | $\omega_{k_2} = 0.2513$ | $\omega_{k_1} = 0.3456$ | $\omega_{k_2} = 0.4398$ |

Notch Fractional Scaling Digital Filter

In another example, the subject innovation can include a Notch Fractional Scaling Digital Filter, with a form of:

$$\frac{O(s)}{I(s)} = K\left(\frac{k_1}{s+k_1}\right)_{\frac{\beta_1}{2}}\left(\frac{s+k_2}{k_2}\right)_{\frac{\beta_2}{2}}\left(\frac{s+k_3}{k_3}\right)_{\frac{\beta_3}{2}}\left(\frac{k_4}{s+k_4}\right)_{\frac{\beta_4}{2}}$$

with (to perform similarly to an ideal notch filter) $k_1 < k_2 < k_3 < k_4$, although $k_1 \leq k_2 \leq k_3 \leq k_4$ may be employed with the result of a Complex Fractional Scaling Digital Filter when any are equal.

An example of a Notch Fractional Scaling Digital Filter has the following parameters shown in Table 14:

TABLE 14

(Notch Fractional Scaling Digital Filter):

| | K | | | | |
|---|---|---|---|---|---|
| Notch Fractional Scaling Digital Filter | (optional) | $\left(\frac{k_1}{s+k_1}\right)_{\frac{\beta}{2}}$ | $\left(\frac{s+k_2}{k_2}\right)_{\frac{\beta}{2}}$ | $\left(\frac{s+k_3}{k_3}\right)_{\frac{\beta}{2}}$ | $\left(\frac{k_4}{s+k_4}\right)_{\frac{\beta}{2}}$ |
| Magnitude $M_{FN}$ | K (optional) | $\sqrt{\dfrac{k_1^\beta}{\omega^\beta + k_1^\beta}}$ | $\sqrt{\dfrac{\omega^\beta + k_2^\beta}{k_2^\beta}}$ | $\sqrt{\dfrac{\omega^\beta + k_3^\beta}{k_3^\beta}}$ | $\sqrt{\dfrac{k_4^\beta}{\omega^\beta + k_4^\beta}}$ |
| Phase $\theta_{(+\omega)FN}$ | ... | $-\tan^{-1}\left(\dfrac{\omega^{\frac{\beta}{2}}}{k_1^{\frac{\beta}{2}}}\right)$ | $\tan^{-1}\left(\dfrac{\omega^{\frac{\beta}{2}}}{k_2^{\frac{\beta}{2}}}\right)$ | $\tan^{-1}\left(\dfrac{\omega^{\frac{\beta}{2}}}{k_3^{\frac{\beta}{2}}}\right)$ | $-\tan^{-1}\left(\dfrac{\omega^{\frac{\beta}{2}}}{k_4^{\frac{\beta}{2}}}\right)$ |
| K | ... | ... | ... | ... | ... |
| $\beta$ | ... | $\beta = 85$ | $\beta = 85$ | $\beta = 85$ | $\beta = 85$ |
| k | ... | $k_1 = 0.035$ | $k_2 = 0.04$ | $k_3 = 0.055$ | $k_4 = 0.062825$ |
| $+\omega_k$ | ... | $\omega_{k_1} = 0.2199$ | $\omega_{k_2} = 0.2513$ | $\omega_{k_1} = 0.3456$ | $\omega_{k_2} = 0.4398$ |

Resonance Fractional Scaling Digital Filter

In another example, the subject innovation can include a Resonance Fractional Scaling Digital Filter, with a form of:

$$\frac{O(s)}{I(s)} = K\left(\frac{k_1^2}{s^2 + 2dk_1 s + k_1^2}\right)_{\frac{\beta_1}{4}} \left(\frac{s+k_2}{k_2}\right)_{\frac{\beta_2}{2}}$$

with $k_1 \leq k_2$.

An example of a Resonance Fractional Scaling Digital Filter has the following parameters shown in Table 15:

Resonance Fractional Scaling Digital Filter with Scaling Correction

In another example, the subject innovation can include a Resonance Fractional Scaling Digital Filter with frequency scaling correction, with a form of:

$$\frac{O(s)}{I(s)} = \left(\frac{K}{s^{\frac{\beta_1}{2}}}\right)\left(\frac{k_1^2}{s^2 + 2dk_1 s + k_1^2}\right)_{\frac{\beta_1}{4}} \left(\frac{s+k_2}{k_2}\right)_{\frac{\beta_2}{2}} \text{ with } k_1 \leq k_2.$$

Examples of Resonance Fractional Scaling Digital Filters with scaling correction have the following parameters shown in Tables 16-29:

TABLE 15

(Resonance Fractional Scaling Digital Filter):

| | K | | |
|---|---|---|---|
| Resonance Fractional Scaling Digital Filter | (optional) | $\left(\dfrac{k_1^2}{s^2 + 2dk_1 s + k_1^2}\right)_{\frac{\beta_1}{2}}$ | $\left(\dfrac{s+k_2}{k_2}\right)_{\frac{\beta_2}{2}}$ |
| Magnitude $M_R$ | K (optional) | $\sqrt{\dfrac{k_1^{\beta_1}}{\omega^{\beta_1} - 2k_1^{\frac{\beta_1}{2}} \omega^{\frac{\beta_1}{2}} + 4d^{\frac{\beta_1}{2}} k_1^{\frac{\beta_1}{2}} \omega^{\frac{\beta_1}{2}} + k_1^{\beta_1}}}$ | $\sqrt{\dfrac{\omega^{\beta_2} + k_2^{\beta_2}}{k_2^{\beta_2}}}$ |
| Phase $\theta_{(+\omega)R}$ | ... | $-\tan^{-1}\left[\dfrac{2d^{\frac{\beta_1}{4}} k_1^{\frac{\beta_1}{4}} \omega^{\frac{\beta_1}{4}}}{k_1^{\frac{\beta_1}{2}} - \omega^{\frac{\beta_1}{2}}}\right]$ | $\tan^{-1}\left(\dfrac{\omega^{\frac{\beta_2}{2}}}{k_2^{\frac{\beta_2}{2}}}\right)$ |
| K | ... | ... | ... |
| $\beta$ | ... | $\beta = 85$ | $\beta = 85$ |
| d | ... | $d = 0.000025$ | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 16

(Resonance Fractional Scaling Digital Filter (SC-A)):

| Resonance Fractional Scaling Digital Filter (SC-A) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
|---|---|---|---|
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = 0$ | $\beta_2 = 85$ | $\beta_3 = 85$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 17

(Resonance Fractional Scaling Digital Filter (SC-A-1)):

| Resonance Fractional Scaling Digital Filter (SC-A-1) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
|---|---|---|---|
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = 0$ | $\beta_2 = 85$ | $\beta_3 = 85$ |
| d | ... | d = 0.000025 | ... |
| k | ... | $k_1 = 0.045$ | $k_2 = 0.05$ |
| $+\omega_k$ | ... | $\omega_{k_1} = 0.2827$ | $\omega_{k_2} = 0.3142$ |

TABLE 18

(Resonance Fractional Scaling Digital Filter (SC-B)):

| Resonance Fractional Scaling Digital Filter (SC-B) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
|---|---|---|---|
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |

TABLE 18-continued (Resonance Fractional Scaling Digital Filter (SC-B)):

| K | K = 1 | ... | ... |
|---|---|---|---|
| β | $\beta_1 = 0$ | $\beta_2 = 85$ | $\beta_3 = 87$ |
| d | ... | d = 0.000025 | ... |
| k | ... | $k_1 = 0.045$ | $k_2 = 0.045$ |
| +$\omega_k$ | ... | $\omega_{k_1} = 0.2827$ | $\omega_{k_2} = 0.2827$ |

TABLE 19

(Resonance Fractional Scaling Digital Filter (SC-B-1)):

| | | | |
|---|---|---|---|
| Resonance Fractional Scaling Digital Filter (SC-B-1) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega_1^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |

| K | K = 1 | ... | ... |
|---|---|---|---|
| β | $\beta_1 = 0$ | $\beta_2 = 85$ | $\beta_3 = 87$ |
| d | ... | d = 0.000025 | ... |
| k | ... | $k_1 = 0.045$ | $k_2 = 0.05$ |
| +$\omega_k$ | ... | $\omega_{k_1} = 0.2827$ | $\omega_{k_2} = 0.3142$ |

TABLE 20

(Resonance Fractional Scaling Digital Filter (SC-C)):

| | | | |
|---|---|---|---|
| Resonance Fractional Scaling Digital Filter (SC-C) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |

| K | K = 1 | ... | ... |
|---|---|---|---|
| β | $\beta_1 = 0$ | $\beta_2 = 85$ | $\beta_3 = 83$ |
| d | ... | d = 0.000025 | ... |
| k | ... | $k_1 = 0.045$ | $k_2 = 0.045$ |
| +$\omega_k$ | ... | $\omega_{k_1} = 0.2827$ | $\omega_{k_2} = 0.2827$ |

TABLE 21

(Resonance Fractional Scaling Digital Filter (SC-D)):

| | | | |
|---|---|---|---|
| Resonance Fractional Scaling Digital Filter (SC-D) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = 2$ | $\beta_2 = 85$ | $\beta_3 = 87$ |
| d | . . . | d = 0.000025 | . . . |
| k | . . . | $k_1 = 0.045$ | $k_2 = 0.045$ |
| $+\omega_k$ | . . . | $\omega_{k_1} = 0.2827$ | $\omega_{k_2} = 0.2827$ |

TABLE 22

(Resonance Fractional Scaling Digital Filter (SC-E)):

| | | | |
|---|---|---|---|
| Resonance Fractional Scaling Digital Filter (SC-E) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = 2$ | $\beta_2 = 85$ | $\beta_3 = 89$ |
| d | . . . | d = 0.000025 | . . . |
| k | . . . | $k_1 = 0.045$ | $k_2 = 0.045$ |
| $+\omega_k$ | . . . | $\omega_{k_1} = 0.2827$ | $\omega_{k_2} = 0.2827$ |

TABLE 23

(Resonance Fractional Scaling Digital Filter (SC-E-1)):

| | | | |
|---|---|---|---|
| Resonance Fractional Scaling Digital Filter (SC-E-1) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |

TABLE 23-continued (Resonance Fractional Scaling Digital Filter (SC-E-1)):

| K | K = 1 | ... | ... |
|---|---|---|---|
| β | $\beta_1 = 2$ | $\beta_2 = 85$ | $\beta_3 = 91$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 24

(Resonance Fractional Scaling Digital Filter (SC-F)):

| Resonance Fractional Scaling Digital Filter (SC-F) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
|---|---|---|---|
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}}\omega^{\frac{\beta_2}{2}} + 4d^{\frac{\beta_2}{2}}k_1^{\frac{\beta_2}{2}}\omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = 2$ | $\beta_2 = 85$ | $\beta_3 = 85$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 25

(Resonance Fractional Scaling Digital Filter (SC-F-1)):

| Resonance Fractional Scaling Digital Filter (SC-F-1) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
|---|---|---|---|
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}}\omega^{\frac{\beta_2}{2}} + 4d^{\frac{\beta_2}{2}}k_1^{\frac{\beta_2}{2}}\omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = 2$ | $\beta_2 = 4$ | $\beta_3 = 4$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 26

(Resonance Fractional Scaling Digital Filter (SC-G)):

| | | | |
|---|---|---|---|
| Resonance Fractional Scaling Digital Filter (SC-G) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = -2$ | $\beta_2 = 85$ | $\beta_3 = 83$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 27

(Resonance Fractional Scaling Digital Filter (SC-H)):

| | | | |
|---|---|---|---|
| Resonance Fractional Scaling Digital Filter (SC-H) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | ... | ... |
| β | $\beta_1 = -2$ | $\beta_2 = 85$ | $\beta_3 = 85$ |
| d | ... | d = 0.000025 | ... |
| k | ... | $k_1 = 0.045$ | $k_2 = 0.045$ |
| $+\omega_k$ | ... | $\omega_{k_1} = 0.2827$ | $\omega_{k_2} = 0.2827$ |

TABLE 28

(Resonance Fractional Scaling Digital Filter (SC-H-1)):

| | | | |
|---|---|---|---|
| Resonance Fractional Scaling Digital Filter (SC-H-1) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}} \omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |

TABLE 28-continued (Resonance Fractional Scaling Digital Filter (SC-H-1)):

| | | | |
|---|---|---|---|
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = -2$ | $\beta_2 = 85$ | $\beta_3 = 87$ |
| d | . . . | d = 0.000025 | . . . |
| k | . . . | $k_1 = 0.045$ | $k_2 = 0.045$ |
| $+\omega_k$ | . . . | $\omega_{k_1} = 0.2827$ | $\omega_{k_2} = 0.2827$ |

TABLE 29

(Resonance Fractional Scaling Digital Filter (SC-I)):

| | | | |
|---|---|---|---|
| Resonance Fractional Scaling Digital Filter (SC-I) | $\left(\dfrac{K}{s^{\frac{\beta_1}{2}}}\right)$ | $\left(\dfrac{k_1^2}{s^2 + 2dk_1 s + k_1^2}\right)_{\frac{\beta_2}{2}}$ | $\left(\dfrac{s + k_2}{k_2}\right)_{\frac{\beta_3}{2}}$ |
| Magnitude $M_{RSC}$ | $\left(\dfrac{K}{\omega^{\frac{\beta_1}{2}}}\right)$ | $\sqrt{\dfrac{k_1^{\beta_2}}{\omega^{\beta_2} - 2k_1^{\frac{\beta_2}{2}}\omega^{\frac{\beta_2}{2}} + 4d^{\frac{\beta_2}{2}} k_1^{\frac{\beta_2}{2}} \omega^{\frac{\beta_2}{2}} + k_1^{\beta_2}}}$ | $\sqrt{\dfrac{\omega^{\beta_3} + k_2^{\beta_3}}{k_2^{\beta_3}}}$ |
| Phase $\theta_{(+\omega)RSC}$ | $\left(-\dfrac{\beta_1 \pi}{4}\right)$ | $-\tan^{-1}\left[\dfrac{2d^{\frac{\beta_2}{4}} k_1^{\frac{\beta_2}{4}} \omega^{\frac{\beta_2}{4}}}{k_1^{\frac{\beta_2}{2}} - \omega^{\frac{\beta_2}{2}}}\right]$ | $\tan^{-1}\left(\dfrac{\omega^{\frac{\beta_3}{2}}}{k_2^{\frac{\beta_3}{2}}}\right)$ |
| K | K = 1 | . . . | . . . |
| β | $\beta_1 = -2$ | $\beta_2 = 85$ | $\beta_3 = 81$ |
| d | . . . | d = 0.000025 | . . . |
| k | . . . | $k_1 = 0.045$ | $k_2 = 0.045$ |
| $+\omega_k$ | . . . | $\omega_{k_1} = 0.2827$ | $\omega_{k_2} = 0.2827$ |

Harmonic Resonance Fractional Scaling Digital Filter

Additionally, multiple Resonance Fractional Scaling Digital Filters can be combined into a filter with multiple resonances by multiplying the transfer functions to obtain a transfer function for the entire filter, with one example disclosed herein referred to as a Harmonic Resonance Fractional Scaling Digital Filter, with parameters shown in Table 30 (wherein the entire transfer function is the product of the individual $HR_n$ transfer functions):

TABLE 30

(Harmonic Resonance Fractional Scaling Digital Filter (SC)):

| Harmonic Resonance Fractional Scaling Digital Filter (SC) | K | $\beta_1$ | $\beta_2$ | $\beta_3$ | $k_1$ | $k_2$ | d |
|---|---|---|---|---|---|---|---|
| $HR_1 = \left(\dfrac{K}{s^{\frac{\beta_1}{2}}}\right)\left(\dfrac{k_1^2}{s^2 + 2dk_1 s + k_1^2}\right)_{\frac{\beta_2}{2}}\left(\dfrac{s + k_2}{k_2}\right)_{\frac{\beta_3}{2}}$ | 1 | 0 | 85 | 85 | $f_0 = 0.0488$ | $f_0 = 0.0488$ | 0.000025 |
| $HR_2 = \left(\dfrac{K}{s^{\frac{\beta_1}{2}}}\right)\left(\dfrac{k_1^2}{s^2 + 2dk_1 s + k_1^2}\right)_{\frac{\beta_2}{2}}\left(\dfrac{s + k_2}{k_2}\right)_{\frac{\beta_3}{2}}$ | 1 | 0 | 85 | 85 | $f_1 = 0.0976$ | $f_1 = 0.0976$ | 0.000025 |
| $HR_3 = \left(\dfrac{K}{s^{\frac{\beta_1}{2}}}\right)\left(\dfrac{k_1^2}{s^2 + 2dk_1 s + k_1^2}\right)_{\frac{\beta_2}{2}}\left(\dfrac{s + k_2}{k_2}\right)_{\frac{\beta_3}{2}}$ | 1 | 0 | 85 | 85 | $f_2 = 0.1464$ | $f_2 = 0.1464$ | 0.000025 |
| $HR_4 = \left(\dfrac{K}{s^{\frac{\beta_1}{2}}}\right)\left(\dfrac{k_1^2}{s^2 + 2dk_1 s + k_1^2}\right)_{\frac{\beta_2}{2}}\left(\dfrac{s + k_2}{k_2}\right)_{\frac{\beta_3}{2}}$ | 1 | 0 | 85 | 85 | $f_3 = 0.1952$ | $f_3 = 0.1952$ | 0.000025 |
| $HR_5 = \left(\dfrac{K}{s^{\frac{\beta_1}{2}}}\right)\left(\dfrac{k_1^2}{s^2 + 2dk_1 s + k_1^2}\right)_{\frac{\beta_2}{2}}\left(\dfrac{s + k_2}{k_2}\right)_{\frac{\beta_3}{2}}$ | 1 | 0 | 85 | 85 | $f_4 = 0.244$ | $f_4 = 0.244$ | 0.000025 |

In other examples, the subject innovation can include complex filter structures such as the Great Lakes FRM discussed herein. Additionally, it is to be understood that other filters may be built through selection of one or more of the fundamental forms shown in FIG. 9 (potentially selecting the same fundamental form more than once, e.g., with varying parameters, as shown in examples discussed above), as well as selection of associated parameters, to construct transfer functions for various applications (e.g., to use as filters, etc.).

In the characterization of human behavior, fractional scaling transfer functions may be used to quantitatively describe the degree of purposeful intent behind an action by allowing specific actions to be categorized into classes of movements based on the original intent of the action. To classify different human activities or behaviors, variations in patterns of movement through time from each human activity may be represented in the frequency domain in a FRM, a mathematical signature characterized by a series of transfer function equations and associated scaling exponents. Once the behavioral FRM signatures are developed from a number of human activities, this catalog of mathematical filters may be used to computationally address movement data, relate the data to a specific human behavior, and possibly to predict future actions.

In the neurosciences, since the filtering of a digital signal is made more accurate and exact through the modified $$\frac{1}{s}$$

noise equations, there is the potential to improve both the collection and analysis of the electrical activity of brain and nervous system signals. Laplace transfer functions with integer-based exponents lack the precision necessary to model the fractional scaling behavior that occurs in many natural, stochastic systems. By redefining Laplace transfer functions with the scaling exponent $\beta$ embedded within the Laplace transform, such as $$\frac{1}{s^{\frac{\beta}{2}}},$$

the fractional scaling characteristics of a natural digital signal may be accurately captured within the FRM through Bode analysis providing a data driven approach to mathematical neuroscience.

Applied to the bioelectrical interface of neuroprosthesis, the mathematics of Fractional Scaling Digital Filters offers several advantages over conventional filters used in DSP algorithms. In decoding a signal, when a volitional motor control signal is filtered using conventional filters, artifacts introduced by the filter (such as phase shifts in some but not all frequencies) may interfere with the ability to extract a meaningful signal for command and control of a neuroprosthesis. However, filtering the same volitional signal with a Fractional Scaling Digital Filter allows total control over how the signal is filtered, can be made to eliminate unwanted phase shifts, and provides a much cleaner, higher resolution, filtered signal overall from which more meaningful information may be extracted leading to the enhanced ability to manipulate a prosthetic limb with multiple degrees of freedom. As such, for the measurement and decoding of natural volitional motor control signals in the peripheral nerves and muscles, a fractional order control systems approach is expected to yield more robust results possibly leading to the ability to restore greater functionality within the controlled movement of a neuroprosthesis.

Additionally, an equation-based FRM may be developed from Fractional Scaling Digital Filters for specific somatosensory signals (e.g., touch, proprioception, pain, temperature). Once a FRM is known for each somatosensory signal, a realistic synthetic signal may be generated to provide accurate, patterned stimulation to sensory pathways of nerves upon activation of the respective sensor of the neuroprosthesis. Potentially, since the FRM of signal is capable of generating statistically identical signals as the original, algorithms encoding somatosensory signals generated through the FRM (and the Fractional Scaling Digital Filters) may be key to restoring a sense of touch and proprioception to the wearer of the neuroprosthesis.

For example, raw EEG data is often passed through a high or low pass filter to isolate the frequencies within a signal. Using the traditional analog equations, a conventional filter is limited to step increments of amplification/attenuation (e.g., −20 dB/decade, −40 dB/decade) with a fixed incremental increase in the value of the integer exponent on the Laplace transform. Using the fractional scaling exponent $\beta$ within the Laplace equations to create a fractional scaling digital filter, the degree of amplification/attenuation can be specified exactly at any frequency to achieve fractional scaling behavior (e.g., $\beta=3.5$ results in −35 dB/decade, $\beta=1.7$ results in −17 dB/decade). In addition to developing precise FRMs of brain and nervous system signals, by integrating the modified $$\frac{1}{s}$$

noise equations into the design of sensors, raw data collected with these advanced sensors may better reflect the true signal through a more refined signal to noise ratio. As a result, potential enhancements of the bioelectrical interface are possible stemming from improvements in sensor and filter design using fractional scaling digital filters in software or hardware by encoding any single or multiple combinations of the 11 fundamental forms of the six basic building blocks transfer functions with the scaling exponent and associated parameters on a FPGA device or DSP chip. Fractional scaling digital filters can yield significant increases the functionality of bionic neuroprosthetics, allow for more accurate interpretation and filtering of bioelectrical signals to augment the signal passed through a spinal cord bridge to repair paralysis, or lead to highly accurate mathematical, computationally-based methods to diagnose neurological disorders.

The fractional mathematics of Fractional Scaling Digital Filters also has applications to additional aspects of human interaction with the environment. The deterministic behavior of the Fractional Scaling Digital Filters provides the ability to create self-optimizing "smart" digital signal processing filters that self-adjust parameters in near-real time to the measured input signal actively adapting to fluctuations or noise within the signal or environment to yield the desired filtered response. Through a quantitative understanding of the mathematics of the noise within a signal, Fractional Scaling Digital Filters may be used to achieve an augmented reality of the environment such as enhanced hearing through a more accurate A-weighting filter or a more focused perception through better resolution or assisted target acquisition in vision systems. In one example, using Fractional Scaling Digital Filters in assessments of hearing damage, a hearing aid may be tailored specifically to the hearing loss of an individual where a variable FRM algorithm may be used as a "smart" digital filter to amplify only the damaged frequencies by constantly modifying the filter based upon variations of frequencies within the input sound signal of the environment. In another example, a sensor incorporating a Fractional Scaling Digital Filter may be designed which selectively focuses on specific frequency regions and then augments those frequencies to allow for the detection of micro-variations (or movements) within signals (e.g., audio, video, radio, etc.) which may have otherwise gone undetected. Thus, the fractional mathematics of $$\frac{1}{s}$$

noise and Fractional Scaling Digital Filters ultimately may lead to human performance augmentation through the combination of an augmented reality of interacting with the environment and the ability to more accurately define movement and control algorithms.

In another embodiment, with the introduction of Fractional Scaling Digital Filters such as the Harmonic Resonance Fractional Scaling Digital Filter (SC) (Table 30), filters and Frequency Response Models may now be designed to mimic the fractal-like scaling behavior often found within music and the natural world allowing computational algorithms to be developed that more fully describe and model harmonics in music and other natural systems. For each note of a musical instrument, the Harmonic Resonance Fractional Scaling Digital Filter (SC) may be used to accurately describe the internal dynamics of the musical instrument across all frequencies, as a system, and how the instrument generates a particular harmonic signature for each note. For example, there are some musical instruments for which each note contains clearly defined harmonic frequencies with resonance peaks of various amplitudes, widths, and well-defined scaling behaviors are observed within the noise between the resonance peaks of the harmonic frequencies. To define a resonance filter that exhibits specific scaling behaviors, scaling corrections may be introduced via each instance of the Resonance Fractional Scaling Digital Filter (SC) used to generate a Harmonic Resonance Fractional Scaling Digital Filter (SC) transfer function that fully describes the harmonics of the notes specific to a particular musical instrument since each instance of the Resonance Fractional Scaling Digital Filter or Resonance Fractional Scaling Digital Filter (SC) can be made independent from adjacent frequency regions or interactive across adjacent frequency regions and also designed to exhibit specific scaling behaviors. Thus, the standard method of synthesizing a note of an instrument using sine waves of various frequencies added together with added noise for realism to simulate harmonics may be replaced by grouping together several filters, each Resonance Fractional Scaling Digital Filter (SC) with parameters adjusted to a specific harmonic frequency range of a note of an instrument, to create a global transfer function, or Harmonic Resonance Fractional Scaling Digital Filter (SC), for each note across all frequencies. The Harmonic Resonance Fractional Scaling Digital Filter (SC) may then be driven by white noise, or a suitable variation, as input to yield an output sound similar to a realistic recording of the note of an instrument to produce a more natural sound. The Harmonic Resonance Fractional Scaling Digital Filter (SC) with several harmonic frequencies, although complex, provides a method to quantitatively describe the harmonic spectrum of a scale of notes of a variety of musical instruments using transfer functions with fractional scaling exponents and represents a new method to create Frequency Response Models of music and musical instruments to generate purely mathematical musical sounds for use in digital synthesizers.

Figure 17:
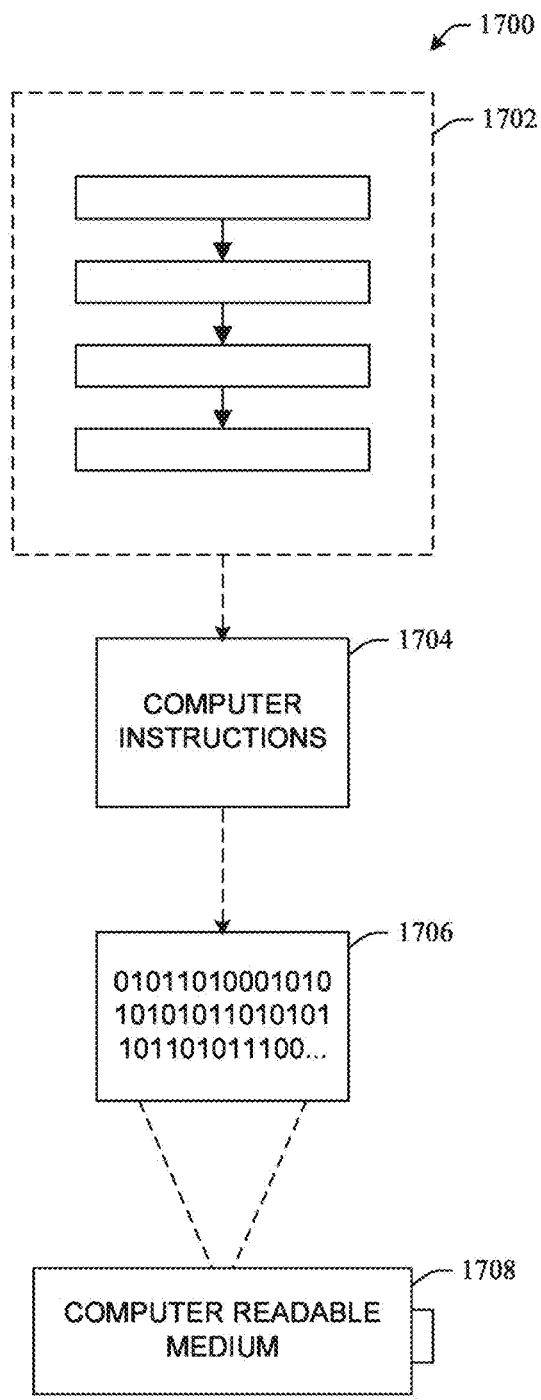
FIG. 17 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 17, wherein an implementation 1700 comprises a computer-readable medium 1708, such as a CD-R, DVD-R, flash drive, a platter of a hard disk drive, etc., on which is encoded computer-readable data 1706. This computer-readable data 1706, such as binary data comprising a plurality of zero's and one's as shown in 1706, in turn comprises a set of computer instructions 1704 configured to operate according to one or more of the principles set forth herein. In one such embodiment 1700, the processor-executable computer instructions 1704 is configured to perform a method 1702, such as at least a portion of one or more of the methods described in connection with embodiments disclosed herein. In another embodiment, the processor-executable instructions 1704 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 18:
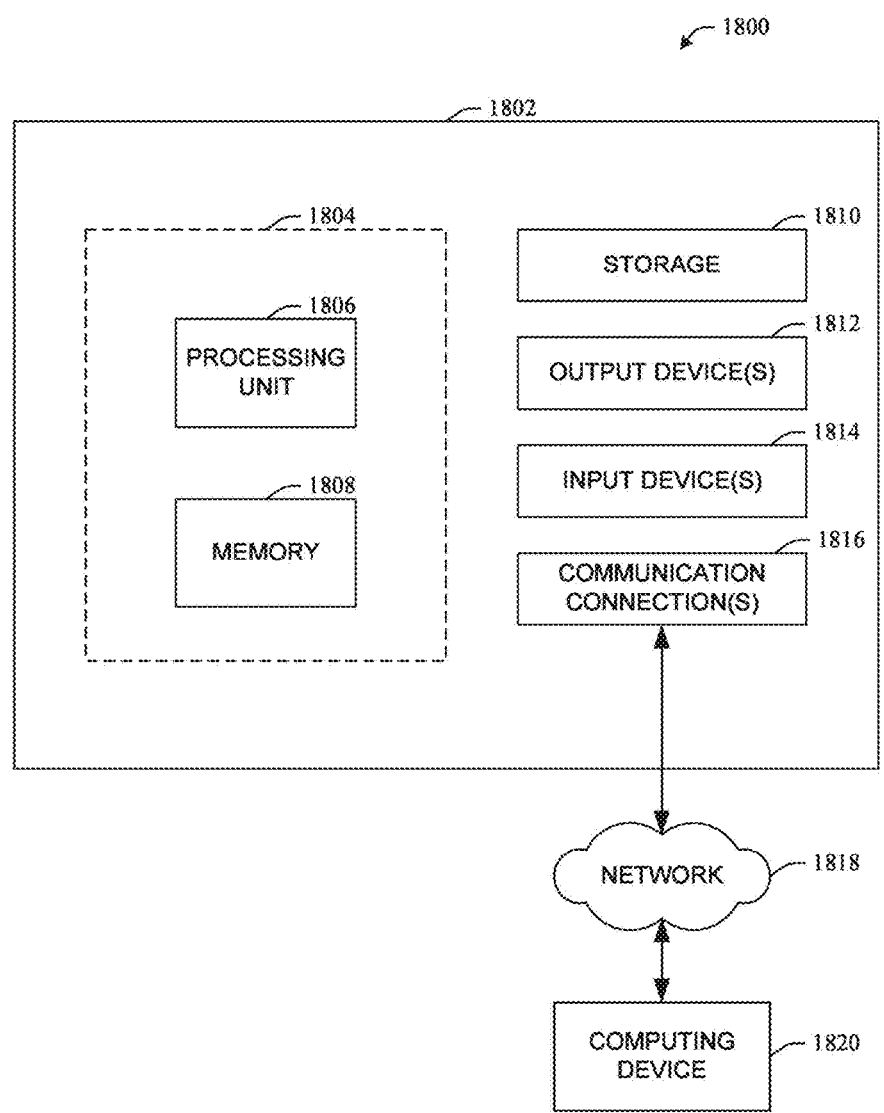
FIG. 18 illustrates a computing environment where one or more of the provisions set forth herein can be implemented, according to some embodiments.

FIG. 18 and the following discussion provide a description of a suitable computing environment in which embodiments of one or more of the provisions set forth herein can be implemented. The operating environment of FIG. 18 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 18 illustrates a system 1800 comprising a computing device 1802 configured to implement one or more embodiments provided herein. In one configuration, computing device 1802 can include at least one processing unit 1806 and memory 1808. Depending on the exact configuration and type of computing device, memory 1808 may be volatile, such as RAM, nonvolatile, such as ROM, flash memory, etc., or some combination of the two. This configuration is illustrated in FIG. 18 by dashed line 1804. In various embodiments, for example, the subject innovation can include FPGA devices or DSP chips or chipsets that can apply one or more transfer functions or filters discussed herein (e.g., employing fractional scaling exponents, etc.) to one or more input signals, for example, as any of a variety of filters as discussed herein, for use in sensors, etc.

In these or other embodiments, device 1802 can include additional features or functionality. For example, device 1802 can also include additional storage such as removable storage or non-removable storage, including, but not limited to, magnetic storage, optical storage, and the like. Such additional storage is illustrated in FIG. 18 by storage 1810. In some embodiments, computer readable instructions to implement one or more embodiments provided herein are in storage 1810. Storage 1810 can also store other computer readable instructions to implement an operating system, an application program, and the like. Computer readable instructions can be loaded in memory 1808 for execution by processing unit 1806, for example.

The term "computer readable media" as used herein includes computer storage media. Computer storage media includes volatile and nonvolatile, removable and non-removable media implemented in any method or technology for storage of information such as computer readable instructions or other data. Memory 1808 and storage 1810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1802. Any such computer storage media can be part of device 1802.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1802 can include one or more input devices 1814 such as keyboard, mouse, pen, voice input device, touch input device, infrared cameras, video input devices, or any other input device. One or more output devices 1812 such as one or more displays, speakers, printers, or any other output device can also be included in device 1802. The one or more input devices 1814 and/or one or more output devices 1812 can be connected to device 1802 via a wired connection, wireless connection, or any combination thereof. In some embodiments, one or more input devices or output devices from another computing device can be used as input device(s) 1814 or output device(s) 1812 for computing device 1802. Device 1802 can also include one or more communication connections 1816 that can facilitate communications with one or more other devices 1820 by means of a communications network 1818, which can be wired, wireless, or any combination thereof, and can include ad hoc networks, intranets, the Internet, or substantially any other communications network that can allow device 1802 to communicate with at least one other computing device 1820.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for processing a digital signal comprising:
   identifying a desired frequency and/or phase response that is represented in a frequency domain representation;
   constructing a fractional order control system that models the desired frequency and/or phase response by assembling a first filter component from a filter component library and a second filter component from the filter component library to construct a fractional scaling digital filter to filter select frequencies of an input such that filtering comprises magnitude and phase modification of the input, where magnitude modification utilizes at least one filter component that is different from that used for phase modification, wherein the filter component library comprises:
   an integrator component;
   a differentiator component;
   a low-pass filter component;
   a high pass filter component;
   a high frequency amplifier component; and
   a low frequency amplifier component;
   wherein:
   at least one filter component of the filter component library is defined by a Laplace function that includes a non-integer control order having a variable fractional scaling exponent; and
   a value for the non-integer, variable fractional scaling exponent of the second filter component is based on a value of the non-integer, variable fractional scaling exponent of the first filter component;
   receiving the input that is in the digital frequency domain;
   processing the input based upon the fractional order control system to generate a digital output; and
   conveying the generated digital output signal.

2. The method of claim 1, wherein:
   constructing a fractional order control system comprises:
   fitting the first filter component from the filter component library to match a first change in the desired frequency and/or phase response;
   fitting the second filter component from the filter component library to match a second change in the desired frequency and/or phase response; and
   working step-wise in a single direction across the range of frequencies in the frequency domain representation, and for each subsequent change in the desired frequency and/or phase response, fitting an associated filter component from the filter component library to match the corresponding subsequent change in the desired frequency and/or phase response.

3. The method of claim 2 further comprising:
   defining each one of the filter components in the filter component library to have a response that extends the entire range of frequencies in the frequency domain representation;

wherein:
working step-wise in a single direction across the range of frequencies in the frequency domain representation, further comprises:
selecting, for each change in the desired frequency and/or phase response, at least one filter component from the filter component library, such that the sum of the responses of all filter components constructed into the fractional order control system follow the changes across the frequency spectrum of the desired frequency and/or phase response.

4. The method of claim 1, wherein the filter component library further comprises a resonance filter component, and the method further comprises:
defining the integrator component having the form $$\frac{1}{s^{\frac{\beta}{2}}};$$

and
defining the differentiator component having the form $$\frac{1}{s^{\frac{-\beta}{2}}};$$

and
defining the resonance filter component having the form $$\left(\frac{k^2}{s^2 + 2dks + k^2}\right)_{\frac{\beta}{2}};$$

wherein: $\beta$ is a variable of the non-integer control order that represents a negative of a slope of a power spectrum associated with a corresponding section of the desired frequency response.

5. The method of claim 1 further comprising:
defining the low-pass filter component having the form $$\left(\frac{k}{s+k}\right)_{\frac{\beta}{2}};$$

defining the high pass filter component having the form $$\left(\frac{k}{s+k}\right)_{\frac{-\beta}{2}};$$

defining the high frequency amplifier component having the form $$\left(\frac{s+k}{k}\right)_{\frac{\beta}{2}};$$

and
defining the low frequency amplifier component having the form $$\left(\frac{s+k}{k}\right)_{\frac{\beta}{2}};$$

wherein: $\beta$ is a variable of the non-integer control order that represents a negative of a slope of a power spectrum associated with a corresponding section of the desired frequency response; and
k represents gain.

6. The method of claim 1, wherein the filter component library further comprises a resonance filter component, and the method further comprises:
defining the integrator component in terms of:

$$\text{magnitude } M_{(\pm\omega)} = \frac{1}{\omega^{\frac{\beta}{2}}}$$

phase as:

$$\theta_{(+\omega)} = -\frac{\beta\pi}{4}$$

$$\theta_{(-\omega)} = \frac{\beta\pi}{4};$$

and
defining the differentiator component in terms of:

$$\text{magnitude } M_{(\pm\omega)} = \frac{1}{\omega^{\frac{-\beta}{2}}}$$

phase as:

$$\theta_{(+\omega)} = \frac{\beta\pi}{4}$$

$$\theta_{(-\omega)} = -\frac{\beta\pi}{4};$$

and
defining the resonance filter component in terms of:

$$\text{magnitude } M_{(\pm\omega)} = \sqrt{\frac{k^\beta}{\omega^\beta - 2k^{\frac{\beta}{2}}\omega^{\frac{\beta}{2}} + 4d^{\frac{\beta}{2}}k^{\frac{\beta}{2}}\omega^{\frac{\beta}{2}} + k^\beta}}$$

phase as:

$$\theta_{(+\omega)} = -\tan^{-1}\left(\frac{2d^{\frac{\beta}{4}}k^{\frac{\beta}{4}}\omega^{\frac{\beta}{4}}}{k^{\frac{\beta}{2}} - \omega^{\frac{\beta}{2}}}\right)$$

wherein: $\beta$ a variable of is the non-integer control order that represents a negative of a slope of a power spectrum associated with a corresponding section of the desired frequency response;

ω is an angular frequency; and
k represents gain; and
d represents a damping coefficient.

7. The method of claim 1 further comprising:
defining the low-pass filter component in terms of:

$$\text{magnitude } M_{(\pm\omega)} = \sqrt{\frac{k^\beta}{\omega^\beta + k^\beta}}$$

phase as:

$$\theta_{(+\omega)} = -\tan^{-1}\left(\frac{\omega^{\frac{\beta}{2}}}{k^{\frac{\beta}{2}}}\right)$$

$$\theta_{(-\omega)} = \tan^{-1}\left(\frac{\omega^{\frac{\beta}{2}}}{k^{\frac{\beta}{2}}}\right);$$

defining the high pass filter component in terms of:

$$\text{magnitude } M_{(\pm\omega)} = \sqrt{\frac{k^{-\beta}}{\omega^{-\beta} + k^{-\beta}}}$$

phase as:

$$\theta_{(+\omega)} = -\tan^{-1}\left(\frac{\omega^{\frac{-\beta}{2}}}{k^{\frac{-\beta}{2}}}\right)$$

$$\theta_{(-\omega)} = \tan^{-1}\left(\frac{\omega^{\frac{-\beta}{2}}}{k^{\frac{-\beta}{2}}}\right);$$

defining the high frequency amplifier component in terms of:

$$\text{magnitude } M_{(\pm\omega)} = \sqrt{\frac{\omega^\beta + k^\beta}{k^\beta}}$$

phase as:

$$\theta_{(+\omega)} = \tan^{-1}\left(\frac{\omega^{\frac{\beta}{2}}}{k^{\frac{\beta}{2}}}\right)$$

$$\theta_{(-\omega)} = -\tan^{-1}\left(\frac{\omega^{\frac{\beta}{2}}}{k^{\frac{\beta}{2}}}\right);$$

and
defining the low frequency amplifier filter component in terms of:

$$\text{magnitude } M_{(\pm\omega)} = \sqrt{\frac{\omega^{-\beta} + k^{-\beta}}{k^{-\beta}}}$$

phase as:

$$\theta_{(+\omega)} = \tan^{-1}\left(\frac{\omega^{\frac{-\beta}{2}}}{k^{-\beta}}\right);$$

$$\theta_{(-\omega)} = -\tan^{-1}\left(\frac{\omega^{\frac{-\beta}{2}}}{k^{-\beta}}\right)$$

wherein: β is a variable of the non-integer control order that represents a negative of a slope of a power spectrum associated with a corresponding section of the desired frequency response;
ω is an angular frequency; and
k represents gain.

8. The method of claim 1, wherein:
the input is a select one of a digital image and video; and
the desired frequency and/or phase response is selected to implement a predetermined image processing function.

9. The method of claim 1, wherein the input is a natural stochastic time series and the desired frequency and/or phase response is selected to cause the output to conform to a statistically identical synthetic model of the natural stochastic time series.

10. The method of claim 1, wherein the input is an analog signal that is converted to the digital frequency domain, and the desired frequency and/or phase response is selected to cause the output to represent a frequency filtered version of the input.

11. The method of claim 1, wherein:
identifying a desired frequency response further comprises identifying a desired frequency response to shape a noise;
constructing a fractional order control system further comprises constructing a fractional order control system to create a model of the desired frequency response to shape the noise;
receiving an input further comprises receiving the noise as an input;
processing the input based on the fractional order control system further comprises multiplying a frequency domain representation of the noise by the model of the desired frequency response to generate the digital output;
further comprising:
processing the digital output by creating a copy of the digital output shifted by one-hundred-and-eighty degrees to generate an inverse digital output;
embedding a payload signal into a select one of the digital output and the inverse digital output to create a transmission signal, designating the remaining one of the digital output and the inverse digital output as a key signal;
conveying the key signal to a receiver; and
sending the transmission signal to the receiver separate from the conveyance of the key signal to the receiver.

12. The method of claim 11 further comprising:
decoding the transmission signal by mixing the transmission signal and the key signal in synchronization.

13. The method of claim 1 further comprising:
self-adjusting the value for the non-integer, variable fractional scaling exponent of the first filter component.

14. The method of claim 13, wherein self-adjusting the value for the non-integer, variable fractional scaling exponent of the first filter component comprises self-adjusting the value for the non-integer, variable fractional scaling exponent of the first filter component based on the received input.

15. The method of claim 14, wherein self-adjusting the value for the non-integer, variable fractional scaling exponent of the first filter component based on the received input comprises self-adjusting the value for the non-integer, variable fractional scaling exponent of the first filter component based on a scaling component of the received input.

\* \* \* \* \*

UNITED STATES PATENT AND TRADEMARK OFFICE
CERTIFICATE OF CORRECTION

PATENT NO. : 10,169,293 B2
APPLICATION NO. : 15/681516
DATED : January 1, 2019
INVENTOR(S) : Jeffrey R. Smigelski It is certified that error appears in the above-identified patent and that said Letters Patent is hereby corrected as shown below:

In the Claims

Claim 4, Column 61, Line 35, $\left(\frac{k^2}{s^2+2dks+k^2}\right)\beta^{\frac{\cdot}{2}}$ should read $\left(\frac{k^2}{s^2+2dks+k^2}\right)\beta^{\frac{\cdot}{4}}$ Claim 5, Column 62, Line 1, $\left(\frac{s+k}{k}\right)\beta^{\frac{\cdot}{2}}$ should read $\left(\frac{s+k}{k}\right)_{\frac{-\beta}{2}}$ Claim 7, Column 64, Line 5, $\theta_{(+\omega)} = \tan^{-1}\left(\frac{\omega\frac{-\beta}{2}}{k^{-\beta}}\right);$ should read $\theta_{(+\omega)} = \tan^{-1}\left(\frac{\omega\frac{-\beta}{2}}{k^{\frac{-\beta}{2}}}\right);$ Signed and Sealed this
Nineteenth Day of March, 2019

Andrei Iancu
*Director of the United States Patent and Trademark Office*